US010644850B2

United States Patent
Yang et al.

(10) Patent No.: US 10,644,850 B2
(45) Date of Patent: May 5, 2020

(54) METHOD AND APPARATUS FOR UPLINK SIGNAL TRANSMISSION

(71) Applicant: ZTE Corporation, Shenzhen, Guangdong (CN)

(72) Inventors: Weiwei Yang, Guangdong (CN); Bo Dai, Guangdong (CN); Shuqiang Xia, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/987,888

(22) Filed: May 23, 2018

(65) Prior Publication Data

US 2018/0278396 A1    Sep. 27, 2018

Related U.S. Application Data

(63) Continuation of application No. PCT/CN2017/074745, filed on Feb. 24, 2017.

(30) Foreign Application Priority Data

Jan. 11, 2016  (CN) .......................... 2016 1 1610019
Apr. 5, 2016   (CN) .......................... 2016 1 0206786

(51) Int. Cl.
*H04W 72/04*   (2009.01)
*H04L 5/00*    (2006.01)
(Continued)

(52) U.S. Cl.
CPC .......... *H04L 5/0048* (2013.01); *H04L 1/1812* (2013.01); *H04L 5/0023* (2013.01);
(Continued)

(58) Field of Classification Search
CPC .............. H04L 5/0048; H04L 27/2613; H04L 27/2611; H04L 5/0023; H04L 1/1812;
(Continued)

(56) References Cited

U.S. PATENT DOCUMENTS

| 2014/0241284 A1 | 8/2014 | Zhou |
| 2014/0286255 A1* | 9/2014 | Nam ..................... H04L 1/1861 370/329 |
| 2018/0316532 A1* | 11/2018 | Tie .......................... H04L 27/26 |

FOREIGN PATENT DOCUMENTS

| CN | 101662443 A | 3/2010 |
| CN | 102123013 A | 7/2011 |
| CN | 103096389 A | 5/2013 |

OTHER PUBLICATIONS

International Search Report and Written Opinion dated May 27, 2017 for International Application No. PCT/CN2017/074745, filed on Feb. 24, 2017 (8 pages).

(Continued)

*Primary Examiner* — Hashim S Bhatti
(74) *Attorney, Agent, or Firm* — Perkins Coie LLP

(57) ABSTRACT

The present disclosure provides a method and an apparatus for uplink signal transmission. The method includes: generating an uplink demodulation reference signal to be transmitted within a first time-frequency unit, the first time-frequency unit including one or more sub-carriers in frequency domain; mapping the uplink demodulation reference signal to a first time-frequency position of the first time-frequency unit; and transmitting the uplink demodulation reference signal within the first time-frequency unit and uplink data corresponding to the uplink demodulation reference signal.

14 Claims, 23 Drawing Sheets

(51) Int. Cl.
  *H04L 1/18*    (2006.01)
  *H04L 27/26*   (2006.01)
  *H04J 13/00*   (2011.01)
(52) U.S. Cl.
  CPC ...... *H04L 27/2611* (2013.01); *H04L 27/2613* (2013.01); *H04W 72/0446* (2013.01); *H04J 13/0062* (2013.01); *H04L 5/0007* (2013.01)
(58) Field of Classification Search
  CPC .............. H04L 5/0007; H04W 72/0446; H04J 13/0062
  See application file for complete search history.

(56) References Cited

OTHER PUBLICATIONS

Chinese Office Action dated Sep. 6, 2019 for Chinese Patent Application No201610206786.1, filed Apr. 5, 2016 (10 pages).
LG Electronics, "Discussions on uplink design for NB-loT," 3GPP TSG RAN WG1 Meeting #83, R1-156884, Anaheim, California, USA, 5 pages, Nov. 2015.

\* cited by examiner

METHOD AND APPARATUS FOR UPLINK SIGNAL TRANSMISSION

CROSS REFERENCE TO RELATED APPLICATIONS

This patent document is a continuation of and claims priority to International Patent Application No. PCT/CN2017/074745, filed on Feb. 24, 2017, which claims the benefits of priorities of Chinese Patent Application No. 201610019212.3, filed on Jan. 11, 2016 and Chinese Patent Application No. 201610206786.1, filed on Apr. 5, 2016. The entire contents of the before-mentioned patent applications are incorporated by reference as part of the disclosure of this document.

TECHNICAL FIELD

The present disclosure relates to, but not limited to, wireless communication technology, and more particularly, to a method and an apparatus for uplink signal transmission.

BACKGROUND

With the development of the wireless communication technology, there has been an explosive growth in demands for amount of traffic, amount of terminals and types of terminals in wireless network applications. The $5^{th}$ Generation of mobile communication technology, also known as 5G, has become a trend of development for future networks. Machine Type Communication (MTC) has received more and more attention as one of the important application scenarios and techniques in 5G systems.

MTC, also referred to as Machine to Machine (M2M) communication, is currently a main form of application of Internet of Things (IoT). Currently available MTC devices are mainly based on Global System of Mobile communication (GSM) system. In the 3rd Generation Partnership Project (3GPP) Technical Report (TR) 45.820 V200, several techniques applicable to Comb-Internet of Things (C-IoT) have been disclosed, among which Narrow Band—Internet of Things (NB-IoT) is the most attractive one. The NB-IoT system has a system bandwidth of 200 kHz, which is the same as the channel bandwidth of the GSM system. This makes it very convenient for the NB-IoT system to reuse GSM spectrums and reduce interference with neighboring GSM channels. In the current Long Term Evolution (LTE) system, all uplink data is scheduled on a basis of Physical Resource Block (PRB). However, the uplink data in the NB-IoT is scheduled on a basis of sub-carrier. Therefore, the NB-IoT cannot reuse the uplink demodulation reference signal in the LTE system.

SUMMARY

A summary of the subject matters described in the present disclosure will be given below. The scopes of the claims are not limited to the summary.

The embodiments of the present disclosure provide a method and an apparatus for uplink signal transmission. With a proper design of transmission scheme for uplink data, an uplink demodulation reference signal can be scheduled for transmission in units of sub-carriers.

In a first aspect, a method for uplink signal transmission is provided according to an embodiment of the present disclosure. The method includes: generating an uplink demodulation reference signal to be transmitted within a first time-frequency unit, the first time-frequency unit including one or more sub-carriers in frequency domain; mapping the uplink demodulation reference signal to a first time-frequency position of the first time-frequency unit; and transmitting the uplink demodulation reference signal within the first time-frequency unit and uplink data corresponding to the uplink demodulation reference signal.

In a first possible implementation of the first aspect, when the first time-frequency unit includes one sub-carrier in the frequency domain, the operation of generating the uplink demodulation reference signal to be transmitted within the first time-frequency unit includes: generating an uplink demodulation reference sequence having a first length based at least on a bandwidth and a sub-carrier spacing of an uplink system; obtaining an uplink demodulation reference signal corresponding to a first sub-unit of the first time-frequency unit from the uplink demodulation reference sequence having the first length based on a frequency-domain position of the first time-frequency unit; and generating the uplink demodulation reference signal to be transmitted within the first time-frequency unit by repeating or extending the uplink demodulation reference signal corresponding to the first sub-unit of the first time-frequency unit.

In a second possible implementation of the first aspect, when the first time-frequency unit includes one sub-carrier in the frequency domain, the operation of generating the uplink demodulation reference signal to be transmitted within the first time-frequency unit includes: generating an uplink demodulation reference sequence having a second length based on a number of resource elements occupied by the uplink demodulation reference signal within the first time-frequency unit, the uplink demodulation reference sequence having the second length being the uplink demodulation reference signal to be transmitted within the first time-frequency unit. Alternatively, the operation of generating the uplink demodulation reference signal to be transmitted within the first time-frequency unit includes: generating an uplink demodulation reference sequence having a second length based on a fixed length, and generating the uplink demodulation reference signal to be transmitted within the first time-frequency unit by repeating, extending or truncating the uplink demodulation reference sequence having the second length.

In a third possible implementation of the first aspect, when the first time-frequency unit includes one sub-carrier in the frequency domain, the first time-frequency position is determined based on one or two of a corresponding second time-frequency position in each second sub-unit of the first time-frequency unit and a time-domain offset.

In the third possible implementation of the first aspect, in a fourth possible implementation, when a sub-carrier spacing of an uplink system is a first spacing threshold and the second sub-unit of the first time-frequency unit has a length of 1 ms, the second time-frequency position is the third Orthogonal Frequency Division Multiplexing (OFDM) symbol in the second sub-unit of the first time-frequency unit. The second sub-unit of the first time-frequency unit includes 3 OFDM symbols.

In the third possible implementation of the first aspect, in a fifth possible implementation, when a sub-carrier spacing of an uplink system is a first spacing threshold and the second sub-unit of the first time-frequency unit has a length of 2 ms, the second time-frequency position is the second or fourth OFDM symbol in the second sub-unit of the first time-frequency unit, and the second sub-unit of the first time-frequency unit includes 6 OFDM symbols. Alternatively, the second time-frequency position is the third or fifth OFDM symbol in the second sub-unit of the first time-frequency unit, and the second sub-unit of the first time-frequency unit includes 7 OFDM symbols. Alternatively, when the uplink signal is a Hybrid Automatic Repeat reQuest (HARQ)—acknowledgement (ACK) signal, the second time-frequency position is the fifth, sixth and seventh OFDM symbols, or the first, second and third OFDM symbols, in the second sub-unit of the first time-frequency unit, and the second sub-unit of the first time-frequency unit includes 7 OFDM symbols.

In the third possible implementation of the first aspect, in a sixth possible implementation, when a sub-carrier spacing of an uplink system is a first spacing threshold and the second sub-unit of the first time-frequency unit has a length of 4 ms, the second time-frequency position is the second and eighth OFDM symbols, or the fourth and tenth OFDM symbols, in the second sub-unit of the first time-frequency unit. The second sub-unit of the first time-frequency unit includes 12 OFDM symbols. Alternatively, the second time-frequency position is the third and tenth OFDM symbols, or the fifth and twelfth OFDM symbols, in the second sub-unit of the first time-frequency unit. The second sub-unit of the first time-frequency unit includes 14 OFDM symbols.

In the third possible implementation of the first aspect, in a seventh possible implementation, the time-domain offset is determined based on one or more of a cell index, a subframe index, a radio frame index and a slot index.

In an eighth possible implementation of the first aspect, when the first time-frequency unit includes a plurality of sub-carriers in the frequency domain, the operation of generating the uplink demodulation reference signal to be transmitted within the first time-frequency unit includes: generating an uplink demodulation reference sequence having a third length based on a number of sub-carriers corresponding to the first time-frequency unit, the uplink demodulation reference sequence having the third length being an uplink demodulation reference signal corresponding to a third sub-unit of the first time-frequency unit; and generating the uplink demodulation reference signal to be transmitted within the first time-frequency unit by repeating or extending the uplink demodulation reference signal corresponding to the third sub-unit of the first time-frequency unit.

In a ninth possible implementation of the first aspect, when the first time-frequency unit includes a plurality of sub-carriers in the frequency domain, the first time-frequency position includes, in the frequency domain, all of the sub-carriers corresponding to the first time-frequency unit. Alternatively, the first time-frequency position includes, in the frequency domain, all sub-carriers in an uplink system. The first time-frequency position includes, in the frequency domain, one of the sub-carriers corresponding to the first time-frequency unit. Alternatively, when the number of sub-carriers in the first time-frequency unit is 12, the first time-frequency position includes, in the frequency domain, all of the sub-carriers corresponding to the first time-frequency unit. Alternatively, when the number of sub-carriers in the first time-frequency unit is smaller than 12, the first time-frequency position includes, in the frequency domain, one of the sub-carriers corresponding to the first time-frequency unit.

In the ninth possible implementation of the first aspect, in a tenth possible implementation, when the first time-frequency position includes, in the frequency domain, one of the sub-carriers corresponding to the first time-frequency unit, a frequency-domain position of the one sub-carrier in the first time-frequency unit is determined based on one or more of a cell index, a subframe index, a radio frame index and a slot index, or based on signaling.

In an eleventh possible implementation of the first aspect, when the first time-frequency unit includes a plurality of sub-carriers in the frequency domain: the first time-frequency position includes, in time domain, a number, N, of OFDM symbols in the middle of each fourth sub-unit in the first time-frequency unit, where N is a positive integer. Alternatively, the first time-frequency position includes, in the time domain, a number, N, of OFDM symbols uniformly distributed, in groups of P, over each fourth sub-unit in the first time-frequency unit, where P and N are both positive integers.

In the eleventh possible implementation of the first aspect, in a twelfth possible implementation, respective positions of the P OFDM symbols in first time-frequency position in the time domain are determined based at least on one or more of a cell index, a subframe index and a radio frame index.

In the first, second or eighth possible implementation of the first aspect, in a thirteenth possible implementation, the operation of extending includes extending based on an orthogonal sequence having an index determined based at least on one or more of a cell index, a subframe index, a radio frame index, a slot index and a terminal index.

In the first, second or eighth possible implementation of the first aspect, in a fourteenth possible implementation, the uplink demodulation reference sequence has an index determined based at least on one or more of a cell index, a subframe index, a radio frame index, a slot index and a terminal index.

In the first, second or eighth possible implementation of the first aspect, in a fifteenth possible implementation, the uplink demodulation reference sequence includes one or more of a Hadamard sequence, a Discrete Fourier Transform (DCT) sequence, a Constant Amplitude Zero Auto-Correlation (CAZAC) sequence, Zadoff-Chu (ZC) sequence, a pseudo-random sequence, a Computer Search Sequence (CGS) sequence and Peak to Average Power Ratio (PAPR) sequence.

In a second aspect, an apparatus for uplink signal transmission is provided. The apparatus comprises: a signal generating module configured to generate an uplink demodulation reference signal to be transmitted within a first time-frequency unit, the first time-frequency unit including one or more sub-carriers in frequency domain; a mapping module configured to map the uplink demodulation reference signal generated by the signal generating module to a first time-frequency position of the first time-frequency unit; and a transmitting module configured to transmit the uplink demodulation reference signal within the first time-frequency unit and uplink data corresponding to the uplink demodulation reference signal.

In a first possible implementation of the second aspect, when the first time-frequency unit includes one sub-carrier in the frequency domain, the signal generating module includes: a first sequence generating unit configured to generate an uplink demodulation reference sequence having a first length based at least on a bandwidth and a sub-carrier spacing of an uplink system; a first signal determining unit configured to obtain an uplink demodulation reference signal corresponding to a first sub-unit of the first time-frequency unit from the uplink demodulation reference sequence having the first length as generated by the first sequence generating unit based on a frequency-domain position of the first time-frequency unit; and a first signal generating unit configured to generate the uplink demodulation reference signal to be transmitted within the first time-frequency unit by repeating or extending the uplink demodulation reference signal corresponding to the first sub-unit of the first time-frequency unit as obtained by the first signal determining unit.

In a second possible implementation of the second aspect, when the first time-frequency unit includes one sub-carrier in the frequency domain, the signal generating module is configured to generate an uplink demodulation reference sequence having a second length based on a number of resource elements occupied by the uplink demodulation reference signal within the first time-frequency unit, the uplink demodulation reference sequence having the second length being the uplink demodulation reference signal to be transmitted within the first time-frequency unit. Alternatively, the signal generating module includes: a second sequence generating unit configured to generate an uplink demodulation reference sequence having a second length based on a fixed length; and a second signal generating unit configured to generate the uplink demodulation reference signal to be transmitted within the first time-frequency unit by repeating, extending or truncating the uplink demodulation reference sequence having the second length as generated by the second sequence generating unit.

In a third possible implementation of the second aspect, when the first time-frequency unit includes one sub-carrier in the frequency domain, the first time-frequency position is determined based on one or two of a corresponding second time-frequency position in each second sub-unit of the first time-frequency unit and a time-domain offset.

In the third possible implementation of the second aspect, in a fourth possible implementation, when a sub-carrier spacing of an uplink system is a first spacing threshold and the second sub-unit of the first time-frequency unit has a length of 1 ms, the second time-frequency position is the third Orthogonal Frequency Division Multiplexing (OFDM) symbol in the second sub-unit of the first time-frequency unit. The second sub-unit of the first time-frequency unit includes 3 OFDM symbols.

In the third possible implementation of the second aspect, in a fifth possible implementation, when a sub-carrier spacing of an uplink system is a first spacing threshold and the second sub-unit of the first time-frequency unit has a length of 2 ms, the second time-frequency position is the second or fourth OFDM symbol in the second sub-unit of the first time-frequency unit, and the second sub-unit of the first time-frequency unit includes 6 OFDM symbols. Alternatively, the second time-frequency position is the third or fifth OFDM symbol in the second sub-unit of the first time-frequency unit, and the second sub-unit of the first time-frequency unit includes 7 OFDM symbols. Alternatively, when the uplink signal is a Hybrid Automatic Repeat reQuest (HARQ)—acknowledgement (ACK) signal, the second time-frequency position is the fifth, sixth and seventh OFDM symbols, or the first, second and third OFDM symbols, in the second sub-unit of the first time-frequency unit. The second sub-unit of the first time-frequency unit includes 7 OFDM symbols.

In the third possible implementation of the second aspect, in a sixth possible implementation, when a sub-carrier spacing of an uplink system is a first spacing threshold and the second sub-unit of the first time-frequency unit has a length of 4 ms, the second time-frequency position is the second and eighth OFDM symbols, or the fourth and tenth OFDM symbols, in the second sub-unit of the first time-frequency unit, and the second sub-unit of the first time-frequency unit includes 12 OFDM symbols. Alternatively, the second time-frequency position is the third and tenth OFDM symbols, or the fifth and twelfth OFDM symbols, in the second sub-unit of the first time-frequency unit, and the second sub-unit of the first time-frequency unit includes 14 OFDM symbols.

In the third possible implementation of the second aspect, in a seventh possible implementation, the time-domain offset is determined based on one or more of a cell index, a subframe index, a radio frame index and a slot index.

In an eighth possible implementation of the second aspect, when the first time-frequency unit includes a plurality of sub-carriers in the frequency domain, the signal generating module includes: a third sequence generating unit configured to generate an uplink demodulation reference sequence having a third length based on a number of sub-carriers corresponding to the first time-frequency unit, the uplink demodulation reference sequence having the third length being an uplink demodulation reference signal corresponding to a third sub-unit of the first time-frequency unit; and a third signal generating unit configured to generate the uplink demodulation reference signal to be transmitted within the first time-frequency unit by repeating or extending the uplink demodulation reference signal corresponding to the third sub-unit of the first time-frequency unit as the third sequence generating unit.

In a ninth possible implementation of the second aspect, when the first time-frequency unit includes a plurality of sub-carriers in the frequency domain, the first time-frequency position includes, in the frequency domain, all of the sub-carriers corresponding to the first time-frequency unit. Alternatively, the first time-frequency position includes, in the frequency domain, all sub-carriers in an uplink system. Alternatively, the first time-frequency position includes, in the frequency domain, one of the sub-carriers corresponding to the first time-frequency unit. Alternatively, when the number of sub-carriers in the first time-frequency unit is 12, the first time-frequency position includes, in the frequency domain, all of the sub-carriers corresponding to the first time-frequency unit. Alternatively, when the number of sub-carriers in the first time-frequency unit is smaller than 12, the first time-frequency position includes, in the frequency domain, one of the sub-carriers corresponding to the first time-frequency unit.

In the ninth possible implementation of the second aspect, in a tenth possible implementation, when the first time-frequency position includes, in the frequency domain, one of the sub-carriers corresponding to the first time-frequency unit, a frequency-domain position of the one sub-carrier in the first time-frequency unit is determined based on one or more of a cell index, a subframe index, a radio frame index and a slot index, or based on signaling.

In an eleventh possible implementation of the second aspect, when the first time-frequency unit includes a plurality of sub-carriers in the frequency domain, the first time-frequency position includes, in time domain, a number, N, of OFDM symbols in the middle of each fourth sub-unit in the first time-frequency unit, where N is a positive integer. Alternatively, the first time-frequency position includes, in the time domain, a number, N, of OFDM symbols uniformly distributed, in groups of P, over each fourth sub-unit in the first time-frequency unit, where P and N are both positive integers.

In the eleventh possible implementation of the second aspect, in a twelfth possible implementation, respective positions of the P OFDM symbols in first time-frequency position in the time domain are determined based at least on one or more of a cell index, a subframe index and a radio frame index.

In the first, second or eighth possible implementation of the second aspect, in a thirteenth possible implementation, the operation of extending includes extending based on an orthogonal sequence having an index determined based at least on one or more of a cell index, a subframe index, a radio frame index, a slot index and a terminal index.

In the first, second or eighth possible implementation of the second aspect, in a fourteenth possible implementation, the uplink demodulation reference sequence has an index determined based at least on one or more of a cell index, a subframe index, a radio frame index, a slot index and a terminal index.

In the first, second or eighth possible implementation of the second aspect, in a fifteenth possible implementation, the uplink demodulation reference sequence includes one or more of a Hadamard sequence, a Discrete Fourier Transform (DCT) sequence, a Constant Amplitude Zero Auto-Correlation (CAZAC) sequence, Zadoff-Chu (ZC) sequence, a pseudo-random sequence, a Computer Search Sequence (CGS) sequence and Peak to Average Power Ratio (PAPR) sequence.

In a third aspect, a computer readable storage medium is provided according to an embodiment of the present disclosure. The computer readable storage medium stores computer executable instructions which, when executed by a processor, perform the above method for uplink signal transmission.

With the method and apparatus for uplink signal transmission according to the embodiments of the present disclosure, an uplink demodulation reference signal to be transmitted within a first time-frequency unit is generated and mapped to a first time-frequency position of the first time-frequency unit. The uplink demodulation reference signal within the first time-frequency unit and uplink data corresponding to the uplink demodulation reference signal are transmitted. The first time-frequency unit includes one or more sub-carriers in frequency domain. In the solutions according to the embodiments of the present disclosure, with a proper design of transmission scheme for uplink data, an uplink demodulation reference signal can be scheduled for transmission in units of sub-carriers.

The other aspects can be understood from the following detailed description and figures.

BRIEF DESCRIPTION OF THE DRAWINGS

The present disclosure can be further understood with reference to the figures described below, which constitute a part of the present disclosure. The figures and the illustrative embodiments of the present disclosure are provided for explaining, rather than limiting, the present disclosure. In the figures.

DETAILED DESCRIPTION OF THE EMBODIMENTS

In the following, the embodiments of the present disclosure will be described in detail with reference to the figures.

It is to be noted that the embodiments, and the features thereof, can be combined with each other, provided that they do not conflict.

The steps shown in the flowchart can be performed as a set of computer executable instructions in a computer system. While a logic sequence is shown in the flowchart, in some circumstances the steps as shown or described can be performed in a sequence other than the one shown in the flowchart.

The following embodiments are provided for explaining the solutions of the present disclosure in detail. In the following embodiments of the present disclosure, a terminal device can be a terminal device in an IoT. The following embodiments as described herein can be combined with each other. The same or similar concepts or processes may not be described repeatedly in some embodiments.

Figure 1:
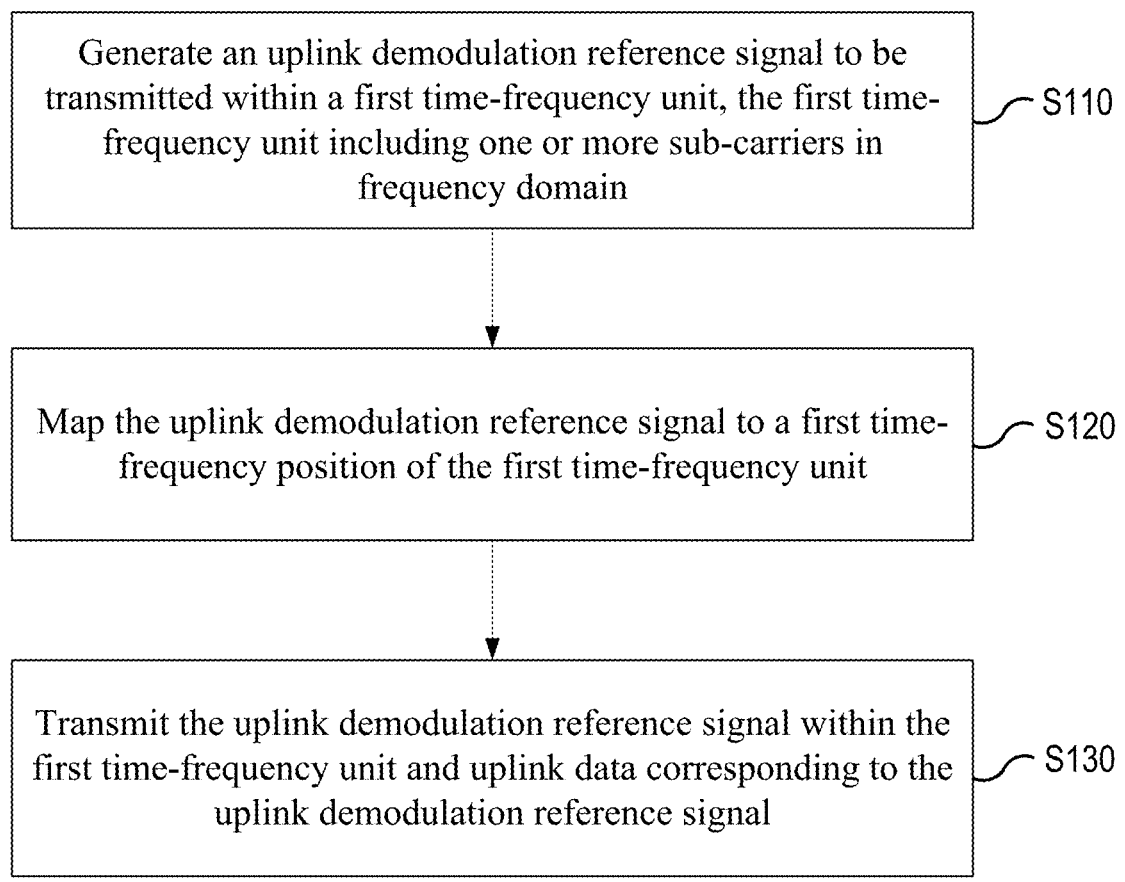
FIG. 1 is a flowchart illustrating a method for uplink signal transmission according to an embodiment of the present disclosure.

FIG. 1 is a flowchart illustrating a method for uplink signal transmission according to an embodiment of the present disclosure. The method for uplink signal transmission according to this embodiment is applicable to transmission of an uplink demodulation reference signal in an NB-IoT. The method can be performed by an apparatus for uplink signal transmission which can be implemented in a combination of software and hardware. The apparatus can be integrated in a processor of a terminal device for invocation and use by the processor. As shown in FIG. 1, the method according to this embodiment can include the following steps.

At S110, an uplink demodulation reference signal to be transmitted within a first time-frequency unit is generated. The first time-frequency unit includes one or more sub-carriers in frequency domain.

The method for uplink signal transmission according to this embodiment is provided for proper configuration of the transmission positions of the uplink demodulation reference signal and uplink data corresponding to the uplink demodulation reference signal. The uplink demodulation reference signal can be e.g., a Demodulation Reference Signal (DMRS). Typically, the transmission of the uplink demodulation reference signal involves various aspects such as a sequence, which is the content of the uplink demodulation reference signal, a position, which is a time-frequency position at which the signal is located at transmission, and a ratio of the uplink demodulation reference signal to the uplink data, which is 1:6 in LTE.

In the current LTE/LTE-Advanced (LTE-A, which is an evolution of LTE) technology, the uplink data is scheduled in units of PRBs. Accordingly, the design of the uplink demodulation reference signal is on a basis of Resource Block (RB), i.e, having 12, or a multiple of 12, sub-carriers in the frequency domain. In the embodiments of the present disclosure, the uplink data corresponding to the uplink demodulation reference signal is scheduled in units of sub-carriers, i.e., having one or more sub-carriers in the frequency domain. That is, in this embodiment, the first time-frequency unit for transmitting the uplink demodulation reference signal can include one or more sub-carriers in the frequency domain.

At S120, the uplink demodulation reference signal is mapped to a first time-frequency position of the first time-frequency unit.

In this embodiment, the mapping of the uplink demodulation reference signal is to map the uplink demodulation reference signal to the first time-frequency position. In an implementation of this embodiment, when the first time-frequency unit includes one sub-carrier, a sub-carrier spacing of an uplink system can be 15 KHz or smaller, e.g., 3.75 KHz. When the first time-frequency unit includes a plurality of sub-carriers, the sub-carrier spacing of the uplink system can be 15 KHz.

At S130, the uplink demodulation reference signal within the first time-frequency unit and uplink data corresponding to the uplink demodulation reference signal are transmitted.

Figure 2:
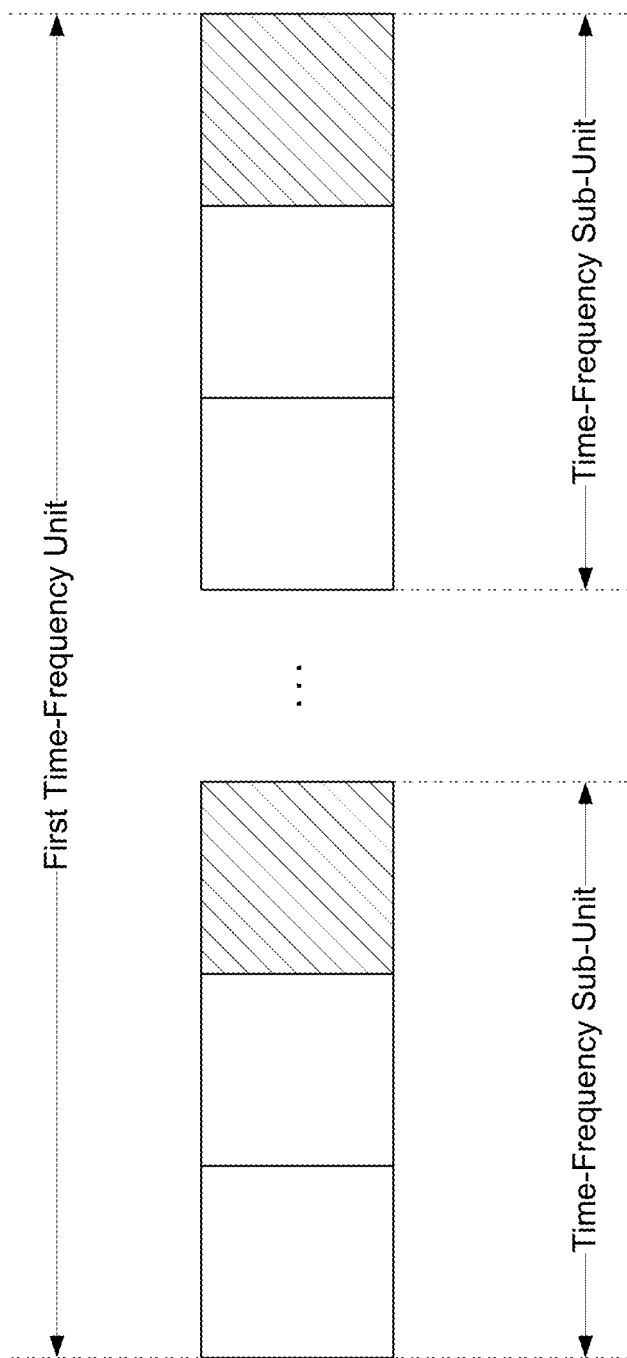
FIG. 2 is a schematic diagram showing a first time-frequency unit in the method for signal transmission provided in the embodiment as shown in FIG. 1.

In this embodiment, as shown in FIG. 2, which is a schematic diagram showing a first time-frequency unit in the method for signal transmission provided in the embodiment as shown in FIG. 1, the first time-frequency unit includes one sub-carrier in the frequency domain. Assuming that the first time-frequency unit has a time-frequency sub-unit of 1 ms and the sub-carrier spacing of the uplink system is 3.75 KHz, the time-frequency sub-unit contains 3 OFDM symbols. Assuming a time-domain offset of 0, the first time-frequency position is at the third OFDM symbol in the time-frequency sub-unit. The first time-frequency unit includes a plurality of such time-frequency sub-units.

With the method for uplink signal transmission according to the embodiments of the present disclosure, an uplink demodulation reference signal to be transmitted within a first time-frequency unit is generated and mapped to a first time-frequency position of the first time-frequency unit. The uplink demodulation reference signal within the first time-frequency unit and uplink data corresponding to the uplink demodulation reference signal are transmitted. The first time-frequency unit includes one or more sub-carriers in frequency domain. In the method according to this embodiment, with a proper design of transmission scheme for uplink data, an uplink demodulation reference signal can be scheduled for transmission in units of sub-carriers.

Figure 3:
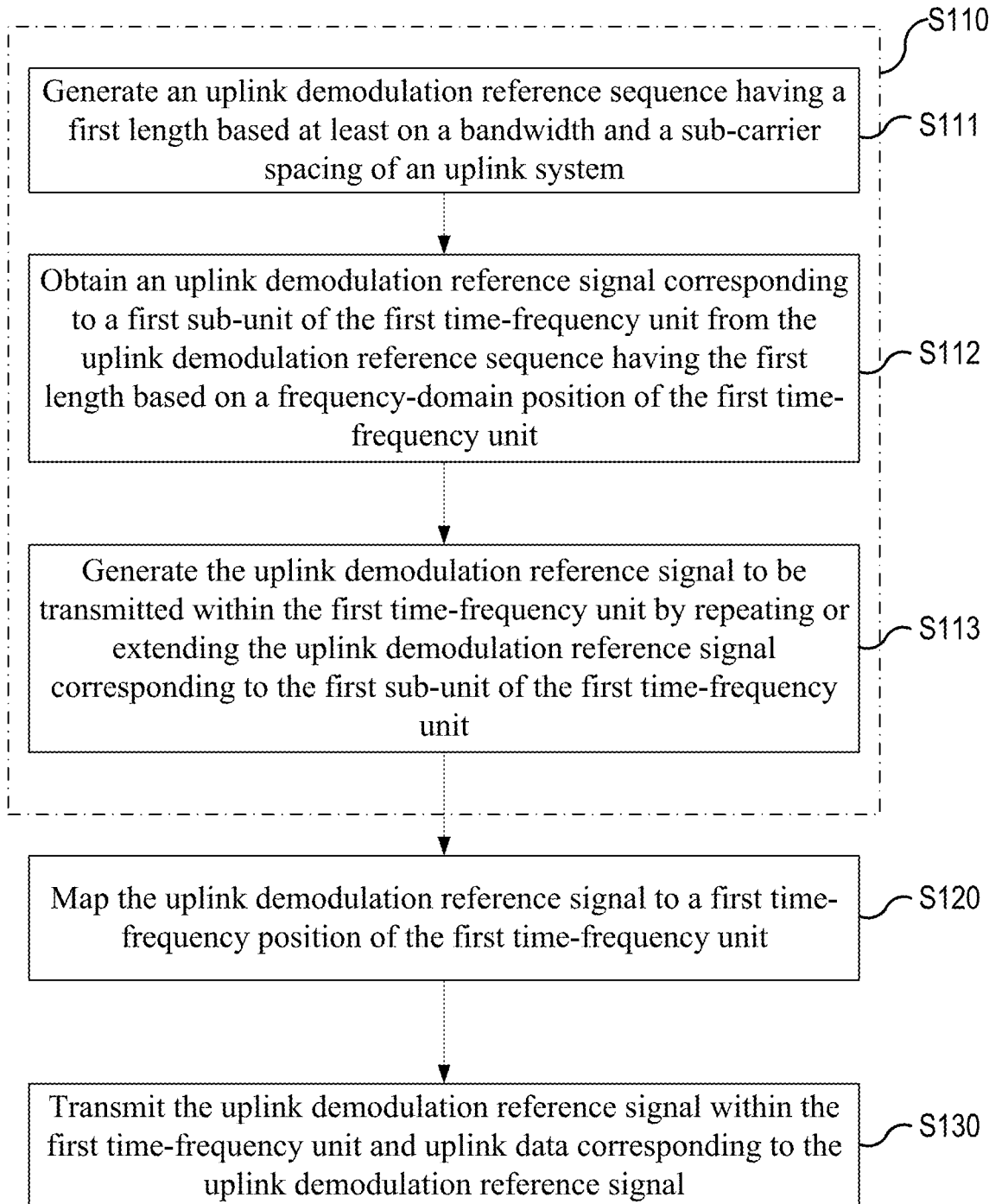
FIG. 3 is a flowchart illustrating a method for uplink signal transmission according to another embodiment of the present disclosure.

FIG. 3 is a flowchart illustrating a method for uplink signal transmission according to another embodiment of the present disclosure. In this embodiment, the first time-frequency unit includes one sub-carrier in the frequency domain. On the basis of the above embodiment shown in FIG. 1, in this embodiment, the operation of generating the uplink demodulation reference signal to be transmitted within the first time-frequency unit (i.e., S110) includes the following steps.

At S111, an uplink demodulation reference sequence having a first length is generated based at least on a bandwidth and a sub-carrier spacing of an uplink system.

At S112, an uplink demodulation reference signal corresponding to a first sub-unit of the first time-frequency unit is obtained from the uplink demodulation reference sequence having the first length based on a frequency-domain position of the first time-frequency unit.

At S113, the uplink demodulation reference signal to be transmitted within the first time-frequency unit is generated by repeating or extending the uplink demodulation reference signal corresponding to the first sub-unit of the first time-frequency unit.

Figure 4:
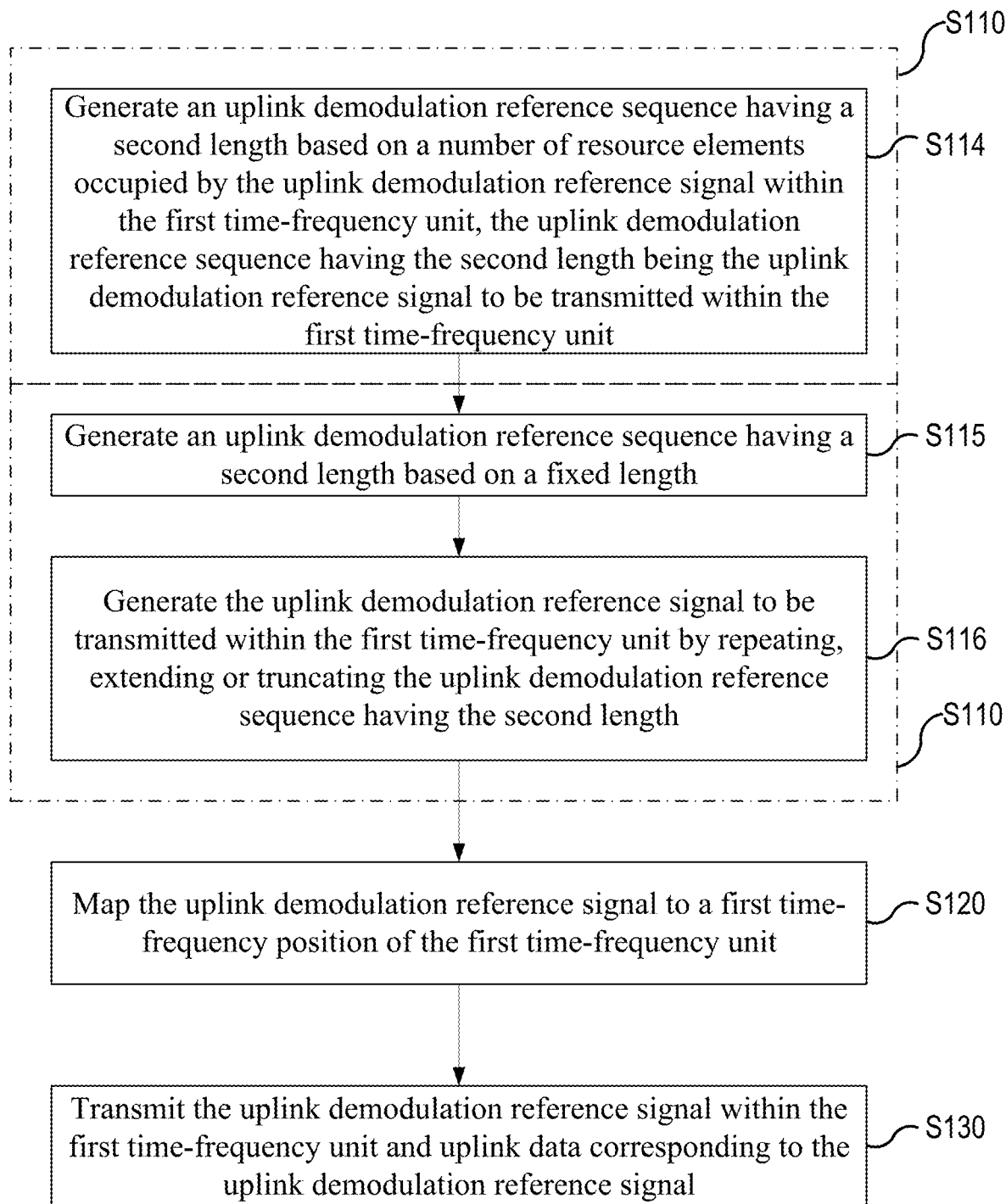
FIG. 4 is a flowchart illustrating a method for uplink signal transmission according to yet another embodiment of the present disclosure.

FIG. 4 is a flowchart illustrating a method for uplink signal transmission according to yet another embodiment of the present disclosure. In this embodiment, the first time-frequency unit also includes one sub-carrier in the frequency domain. On the basis of the above embodiment shown in FIG. 1, in this embodiment, the operation of generating the uplink demodulation reference signal to be transmitted within the first time-frequency unit (i.e., S110) includes the following step.

At S114, an uplink demodulation reference sequence having a second length is generated based on a number of resource elements occupied by the uplink demodulation reference signal within the first time-frequency unit. The uplink demodulation reference sequence having the second length is the uplink demodulation reference signal to be transmitted within the first time-frequency unit.

In another possible implementation of the embodiment shown in FIG. 4, the step S110 can include the following steps.

At S115, an uplink demodulation reference sequence having a second length is generated based on a fixed length.

At S116, the uplink demodulation reference signal to be transmitted within the first time-frequency unit is generated by repeating, extending or truncating the uplink demodulation reference sequence having the second length.

Here, in the embodiment shown in FIG. 4, the step S114 and the steps S115-S116 can be performed in an alternative way.

In the above embodiments, when the first time-frequency unit includes one sub-carrier in the frequency domain, the first time-frequency position is determined based on one or two of a corresponding second time-frequency position in each second sub-unit of the first time-frequency unit and a time-domain offset. In this embodiment, the first time-frequency unit has a plurality of second sub-units. Referring to the first time-frequency unit shown in FIG. 2, each time-frequency sub-unit is a second sub-unit of the first time-frequency unit. The second sub-unit of the first time-frequency unit can have a time-domain length of e.g., 1 ms, 2 ms or 4 ms. The number of OFDM symbols in every 1 ms is dependent on a sub-carrier spacing. In an implementation, there is typically a time-domain offset. Hence, in the embodiment of the present disclosure, the first time-frequency position can be determined based on one or two of the second time-frequency position and the time-domain offset. The time-domain offset can be determined based on one or more of a cell index, a subframe index, a radio frame index and a slot index. In an example, the time-domain offset is determined based on a cell index, i.e., the time-domain offset can be different for different cells. For example, when a serving cell 1 corresponds to a time-domain offset of 1, there is an offset of 1 subframe to the right in relation to the second time-frequency position. When a serving cell 2 corresponds to a time-domain offset of 2, there is an offset of 2 subframes to the right in relation to the second time-frequency position. Here, it is assumed that the time-domain offset is the number of subframes to be shifted. Alternatively, a relation between the time-domain offset and the number of subframes to be shifted can be pre-defined.

Referring to the above schemes for generating the uplink demodulation reference signal in FIGS. 3 and 4, examples will be given below for explaining several possible cases of the second time-frequency position when the first time-frequency unit includes one sub-carrier in the frequency domain.

Case 1: When a sub-carrier spacing of an uplink system is a first spacing threshold and the second sub-unit of the first time-frequency unit has a length of 1 ms, the second time-frequency position is the third OFDM symbol in the second sub-unit of the first time-frequency unit. The second sub-unit of the first time-frequency unit includes 3 OFDM symbols.

Figure 5:
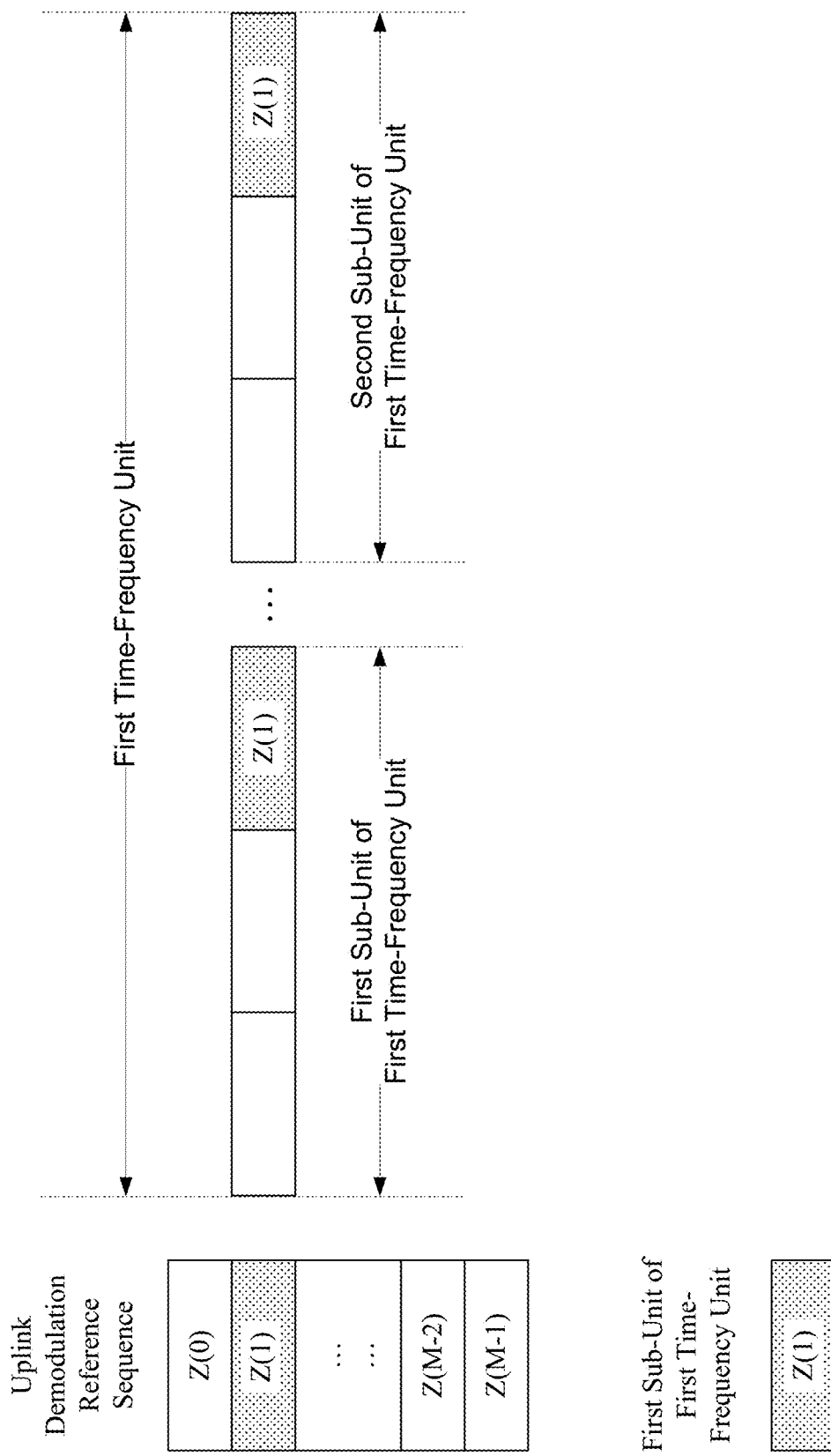
FIG. 5 is a schematic diagram showing a first time-frequency unit in the method for signal transmission provided in the embodiment as shown in FIG. 3.

FIG. 5 is a schematic diagram showing a first time-frequency unit in the method for signal transmission provided in the embodiment as shown in FIG. 3. In this embodiment, the first spacing threshold is 3.75 KHz and the number of sub-carriers in the uplink system is 48. For example, the first time-frequency unit can be one single sub-carrier having a sub-carrier index of 1 and the second sub-unit of the first time-frequency unit has a length of 1 ms. The uplink demodulation reference signal generated according to FIG. 3 is shown in FIG. 5. Since the number of sub-carriers in the uplink system is 48, a Zadoff-Chu (ZC) sequence $\{Z(0), Z(1), \ldots, Z(47)\}$ having a length of 48 can be generated. Based on the frequency-domain position of the first time-frequency unit, an uplink demodulation reference signal $Z(1)$ corresponding to a first sub-unit of the first time-frequency unit can be obtained. The uplink demodulation reference signal $Z(1)$ can be repeated or extended (e.g., repeated in this case) to obtain the uplink demodulation reference signal $\{Z(1), Z(1), \ldots, Z(1)\}$ corresponding to the first time-frequency unit. Since the second sub-unit of the first time-frequency unit has a length of 1 ms, the second time-frequency position corresponding to the uplink demodulation reference signal is the third OFDM symbol in the second sub-unit of the first time-frequency unit, as shown in FIG. 5.

Case 2: When a sub-carrier spacing of an uplink system is a first spacing threshold and the second sub-unit of the first time-frequency unit has a length of 2 ms, the second time-frequency position is the second or fourth OFDM symbol in the second sub-unit of the first time-frequency unit, and the second sub-unit of the first time-frequency unit includes 6 OFDM symbols. Alternatively, the second time-frequency position is the third or fifth OFDM symbol in the second sub-unit of the first time-frequency unit, and the second sub-unit of the first time-frequency unit includes 7 OFDM symbols. Alternatively, in a special application scenario in this case, when the uplink signal is only a Hybrid Automatic Repeat reQuest (HARQ)—acknowledgement (ACK) signal, the second time-frequency position is the fifth, sixth and seventh OFDM symbols, or the first, second and third OFDM symbols, in the second sub-unit of the first time-frequency unit, and in this scenario the second sub-unit of the first time-frequency unit also includes 7 OFDM symbols.

Figure 6:
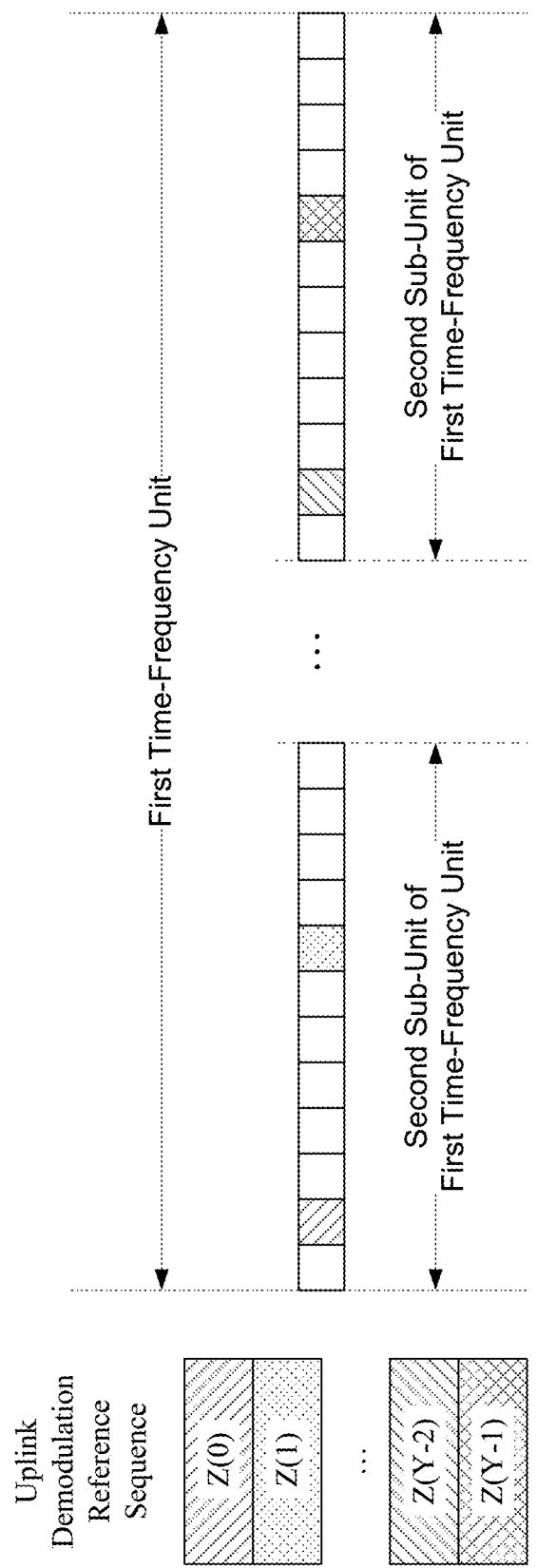
FIG. 6 is a schematic diagram showing a first time-frequency unit in the method for signal transmission provided in the embodiment as shown in FIG. 4.

FIG. 6 is a schematic diagram showing a first time-frequency unit in the method for signal transmission provided in the embodiment as shown in FIG. 4. In this embodiment, the first spacing threshold is 3.75 KHz and the number of sub-carriers in the uplink system is 48. For example, the first time-frequency unit can be one single sub-carrier having a sub-carrier index of 1 and the second sub-unit of the first time-frequency unit has a length of 2 ms and includes 6 OFDM symbols. The uplink demodulation reference signal generated according to FIG. 4 is shown in FIG. 6. Since the time-domain length of the first time-frequency unit is 48 ms and the second sub-unit of the first time-frequency unit has a length of 2 ms, a ZC sequence $\{Z(0), Z(1), \ldots, Z(23)\}$ having a length of 24 can be generated. Then, the uplink demodulation reference signal within the first time-frequency unit is $\{Z(0), Z(1), \ldots, Z(23)\}$. Since the second sub-unit of the first time-frequency unit has a length of 2 ms, the second time-frequency position corresponding to the uplink demodulation reference signal is the second or fourth OFDM symbol in the second sub-unit of the first time-frequency unit. FIG. 6 shows an example where the second time-frequency position is the second OFDM symbol in the second sub-unit of the first time-frequency unit.

Alternatively, in this embodiment, it is possible to generate a sequence having a length that is a multiple of 12 or having a fixed length, and then obtain the uplink demodulation reference signal by repeating, extending or truncating the uplink demodulation reference sequence.

Figure 7:
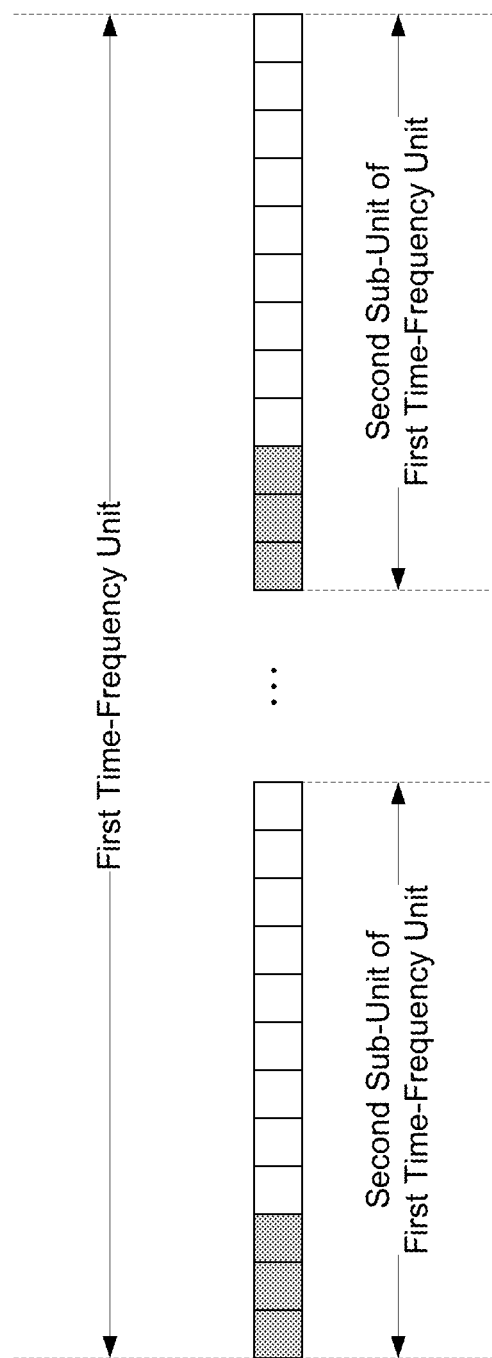
FIG. 7 is a schematic diagram showing another first time-frequency unit in the method for signal transmission provided in the embodiment as shown in FIG. 4.

For example, FIG. 7 is a schematic diagram showing another first time-frequency unit in the method for signal transmission provided in the embodiment as shown in FIG.

4. In this embodiment, the first spacing threshold is 3.75 KHz and the uplink signal is only an HARQ-ACK signal. For example, the first time-frequency unit can be one single sub-carrier having a sub-carrier index of 1 and have a time-domain length of 8 ms. The second sub-unit of the first time-frequency unit has a length of 2 ms and includes 7 OFDM symbols. The uplink demodulation reference signal generated according to FIG. 4 is shown in FIG. 7. Since the first time-frequency unit has a time-domain length of 8 ms and the second sub-unit of the first time-frequency unit has a length of 2 ms, a CSG sequence {C(0), C(1), . . . , C(3)} having a length of 4 can be generated. Then, the uplink demodulation reference signal within the first time-frequency unit is {C(0)W(0), C(0)W(1), C(0)W(2), C(1)W(0), C(1)W(1), C(3)W(3)} obtained by extending the CSG sequence {C(0), C(1), . . . , C(3)} having a length of 4 with an OCC sequence [W(0), W(1), W(2)] having a length of 3. Here, the OCC sequence is shown in Table 1 below. An OCC sequence index can be determined based at least on a serving cell index and a slot index. In an example, an OCC index=mod($n_{ID}^{Cell}+n_s$, 3), where mod denotes a modulus operation, $n_{ID}^{Cell}$ is a serving cell index and $n_s$ is a slot index.

TABLE 1

OCC sequence having a length of 3

| OCC Sequence Index | OCC Sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Since in the LTE a Sounding Reference Signal (SRS) is at the last symbol of each subframe, and for mapping of the DMRS, collision with the LTE SRS should be considered, the DMRS can be mapped onto the first, second and third OFDM symbols, or the fifth, sixth and seventh OFDM symbols. In the example shown in FIG. 7, the second time-frequency position corresponding to the uplink demodulation reference sequence is the first, second and third OFDM symbols in the second sub-unit of the first time-frequency unit.

Case 3: When a sub-carrier spacing of an uplink system is a first spacing threshold and the second sub-unit of the first time-frequency unit has a length of 4 ms, the second time-frequency position is the second and eighth OFDM symbols, or the fourth and tenth OFDM symbols, in the second sub-unit of the first time-frequency unit. The second sub-unit of the first time-frequency unit includes 12 OFDM symbols. Alternatively, the second time-frequency position is the third and tenth OFDM symbols, or the fifth and twelfth OFDM symbols, in the second sub-unit of the first time-frequency unit. The second sub-unit of the first time-frequency unit includes 14 OFDM symbols.

The above time-domain position of the DMRS is determined such that one or more of the following conditions are met: (1) collision with the LTE SRS should be considered; and (2) the DMRS should not extend across two LTE subframes.

Figure 8:
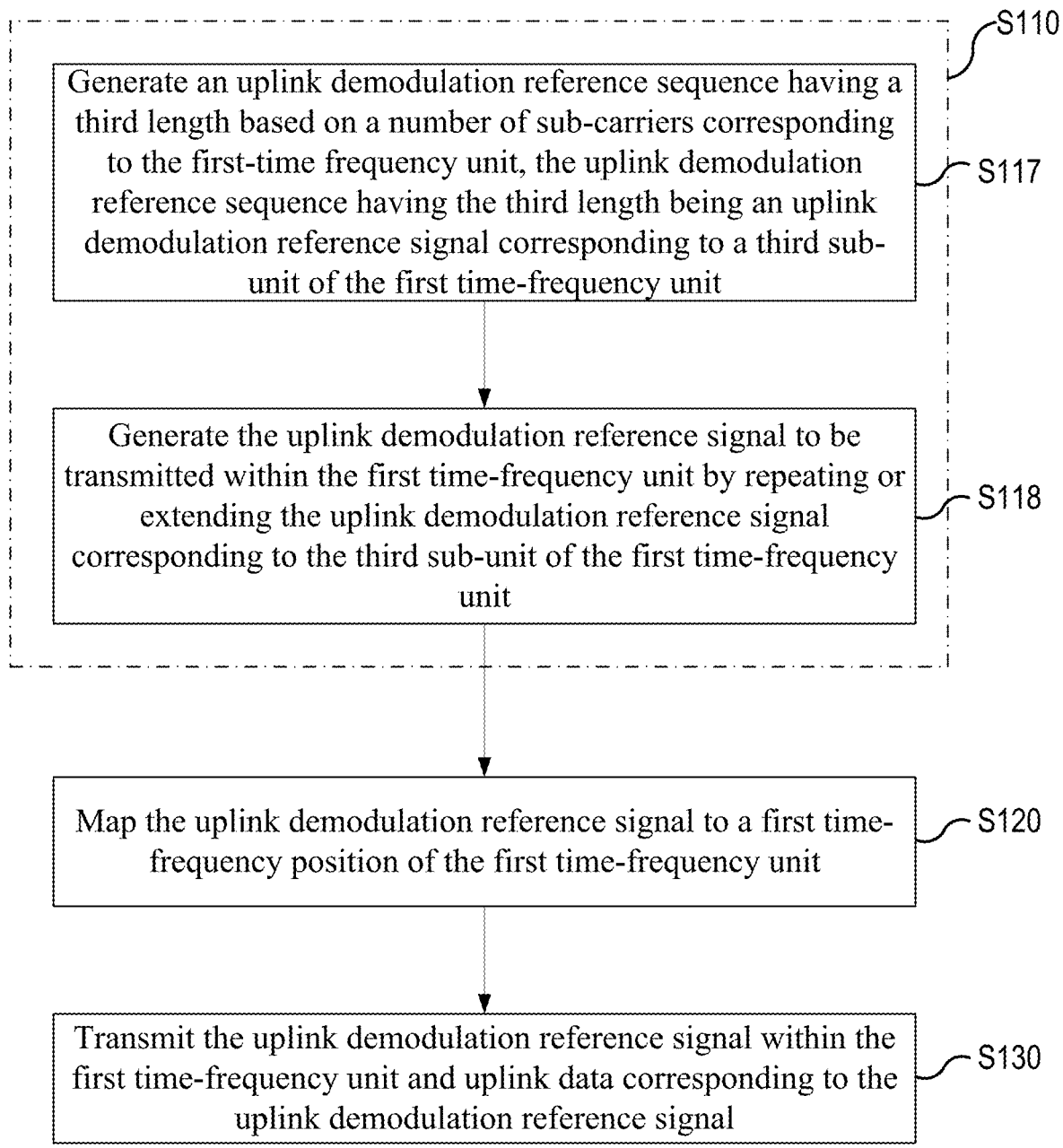
FIG. 8 is a flowchart illustrating a method for uplink signal transmission according to a further embodiment of the present disclosure.

FIG. 8 is a flowchart illustrating a method for uplink signal transmission according to a further embodiment of the present disclosure. In this embodiment, the first time-frequency unit includes a plurality of sub-carriers in the frequency domain. On the basis of the above embodiment shown in FIG. 1, in this embodiment, the operation of generating the uplink demodulation reference signal to be transmitted within the first time-frequency unit (i.e., S110) includes the following step.

At S117, an uplink demodulation reference sequence having a third length is generated based on a number of sub-carriers corresponding to the first time-frequency unit. The uplink demodulation reference sequence having the third length is an uplink demodulation reference signal corresponding to a third sub-unit of the first time-frequency unit.

At S118, the uplink demodulation reference signal to be transmitted within the first time-frequency unit is generated by repeating or extending the uplink demodulation reference signal corresponding to the third sub-unit of the first time-frequency unit.

Figure 9:
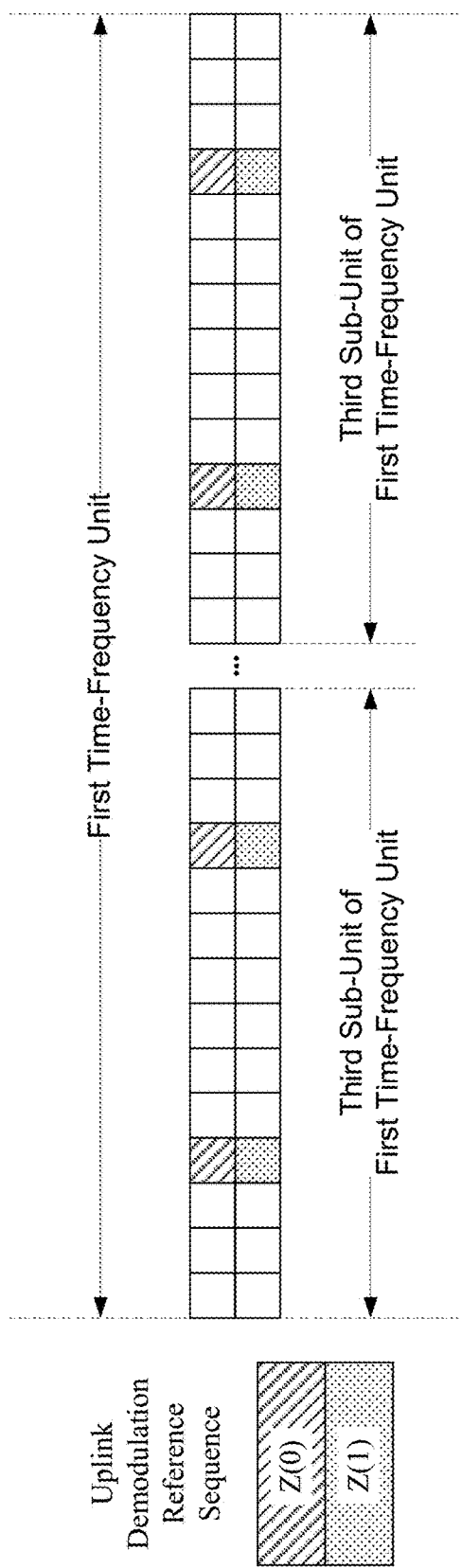
FIG. 9 is a schematic diagram showing a first time-frequency unit in the method for signal transmission provided in the embodiment as shown in FIG. 8.

In this embodiment, the length of the generated uplink demodulation reference sequence is typically the same as the number of sub-carriers in the first time-frequency unit. For example, FIG. 9 is a schematic diagram showing a first time-frequency unit in the method for signal transmission provided in the embodiment as shown in FIG. 8. In this embodiment, the sub-carrier spacing of the uplink system is 15 KHz, the number of sub-carriers in the uplink system is 12, and the number of uplink sub-carriers allocated by the base station for the terminal device is 2. The uplink demodulation reference signal generated according to FIG. 8 is shown in FIG. 9. Since the first time-frequency unit has a frequency-domain length of 2, a Discrete Fourier Transform (DCT) sequence {D(0), D(1)} having a length of 2 can be generated. The sequence {D(0), D(1)} can be the uplink demodulation reference signal corresponding to a third sub-unit of the first time-frequency unit. The uplink demodulation reference signal corresponding to the third sub-unit of the first time-frequency unit can be repeated to obtain the uplink demodulation reference signal to be transmitted within the first time-frequency unit. FIG. 9 shows the first time-frequency position, which is an example of the first time-frequency position when the first time-frequency unit includes a plurality of sub-carriers in the frequency domain.

In the above embodiments of the present disclosure, the operation of extending may include extending based on an orthogonal sequence having an index determined based at least on one or more of a cell index, a subframe index, a radio frame index, a slot index and a terminal index. The uplink demodulation reference sequence can have an index determined based at least on one or more of a cell index, a subframe index, a radio frame index, a slot index and a terminal index. The uplink demodulation reference sequence may typically include one or more of a Hadamard sequence, a Discrete Fourier Transform (DCT) sequence, a Constant Amplitude Zero Auto-Correlation (CAZAC) sequence, Zadoff-Chu (ZC) sequence, a pseudo-random sequence, a Computer Search Sequence (CGS) sequence and Peak to Average Power Ratio (PAPR) sequence.

For example, it is assumed that the uplink demodulation reference sequence having a second length is generated based on the number of resource elements occupied by the uplink demodulation reference signal within the first time-frequency unit. It is further assumed that the number of resource elements occupied by the uplink demodulation reference signal within the first time-frequency unit is 16. Then, the length of the uplink demodulation reference sequence having the second length is 16. It is assumed that the uplink demodulation reference sequence is obtained by multiplying a Hadamard sequence with a pseudo-random sequence. It is further assumed that 32 sequences each having a length of 16 are [$UH_{16}$ $H_{16}$], where $H_{16}$ is a Hadamard matrix having a length of 16 and U is a 1*16 matrix. An example implementation is shown in Table 2 below. The pseudo-random sequence is a sequence used in the LTE system. The initial value of the pseudo-random sequence can be determined based on one or more of a length of a resource element corresponding to one carrier, a subframe index, a radio frame index, a terminal index and a slot index. Details of the pseudo-random sequence will be omitted here.

TABLE 2

32 sequences each having a length of 16

| Sequence No. | $\varphi(0), \ldots, \varphi(15)$ | | | | | | | | | | | | | | | |
|---|---|---|---|---|---|---|---|---|---|---|---|---|---|---|---|---|
| 0 | 1 | 1 | 1 | 1 | 1 | −1 | −1 | −1 | 1 | −1 | 1 | 1 | −1 | −1 | 1 | 1 |
| 1 | 1 | −1 | 1 | −1 | 1 | 1 | −1 | 1 | 1 | 1 | 1 | −1 | −1 | 1 | 1 | −1 |
| 2 | 1 | 1 | −1 | −1 | 1 | −1 | 1 | 1 | 1 | −1 | −1 | −1 | −1 | −1 | −1 | −1 |
| 3 | 1 | −1 | −1 | 1 | 1 | 1 | 1 | −1 | 1 | 1 | −1 | 1 | −1 | 1 | −1 | 1 |
| 4 | 1 | 1 | 1 | 1 | −1 | 1 | 1 | 1 | 1 | −1 | 1 | 1 | 1 | 1 | −1 | −1 |
| 5 | 1 | −1 | 1 | −1 | −1 | −1 | 1 | −1 | 1 | 1 | 1 | −1 | 1 | −1 | −1 | 1 |
| 6 | 1 | 1 | −1 | −1 | −1 | 1 | −1 | −1 | 1 | −1 | −1 | −1 | 1 | 1 | 1 | 1 |
| 7 | 1 | −1 | −1 | 1 | −1 | 1 | −1 | 1 | 1 | 1 | 1 | 1 | −1 | 1 | 1 | −1 |
| 8 | 1 | 1 | 1 | 1 | −1 | −1 | −1 | −1 | 1 | −1 | 1 | 1 | 1 | 1 | −1 | −1 |
| 9 | 1 | −1 | 1 | −1 | 1 | 1 | −1 | 1 | −1 | −1 | 1 | 1 | 1 | −1 | −1 | 1 |
| 10 | 1 | 1 | −1 | −1 | 1 | −1 | 1 | 1 | −1 | 1 | 1 | 1 | 1 | 1 | 1 | 1 |
| 11 | 1 | −1 | −1 | 1 | 1 | 1 | 1 | −1 | −1 | −1 | 1 | −1 | 1 | −1 | 1 | −1 |
| 12 | 1 | 1 | 1 | 1 | −1 | 1 | 1 | 1 | −1 | 1 | −1 | −1 | −1 | −1 | 1 | 1 |
| 13 | 1 | −1 | 1 | −1 | −1 | −1 | 1 | −1 | −1 | −1 | −1 | 1 | −1 | 1 | 1 | −1 |
| 14 | 1 | 1 | −1 | −1 | −1 | 1 | −1 | −1 | −1 | 1 | 1 | −1 | −1 | −1 | −1 | −1 |
| 15 | 1 | −1 | −1 | 1 | −1 | 1 | −1 | 1 | −1 | −1 | 1 | −1 | 1 | −1 | 1 | 1 |
| 16 | 1 | 1 | 1 | 1 | 1 | 1 | 1 | 1 | 1 | 1 | 1 | 1 | 1 | 1 | 1 | 1 |
| 17 | 1 | −1 | 1 | −1 | 1 | −1 | 1 | −1 | 1 | −1 | 1 | −1 | 1 | −1 | 1 | −1 |
| 18 | 1 | 1 | −1 | −1 | 1 | 1 | −1 | −1 | 1 | 1 | −1 | −1 | 1 | 1 | −1 | −1 |
| 19 | 1 | −1 | −1 | 1 | 1 | −1 | −1 | 1 | 1 | −1 | −1 | 1 | 1 | −1 | −1 | 1 |
| 20 | 1 | 1 | 1 | 1 | −1 | −1 | −1 | −1 | 1 | 1 | 1 | 1 | −1 | −1 | −1 | −1 |
| 21 | 1 | −1 | 1 | −1 | −1 | 1 | −1 | 1 | 1 | −1 | 1 | −1 | −1 | 1 | −1 | 1 |
| 22 | 1 | 1 | −1 | −1 | −1 | −1 | 1 | 1 | 1 | 1 | −1 | −1 | −1 | −1 | 1 | 1 |
| 23 | 1 | −1 | −1 | 1 | −1 | 1 | 1 | −1 | 1 | −1 | −1 | 1 | −1 | 1 | 1 | −1 |
| 24 | 1 | 1 | 1 | 1 | 1 | 1 | 1 | 1 | −1 | −1 | −1 | −1 | −1 | −1 | −1 | −1 |
| 25 | 1 | −1 | 1 | −1 | 1 | −1 | 1 | −1 | −1 | 1 | −1 | 1 | −1 | 1 | −1 | 1 |
| 26 | 1 | 1 | −1 | −1 | 1 | 1 | −1 | −1 | −1 | −1 | 1 | 1 | −1 | −1 | 1 | 1 |
| 27 | 1 | −1 | −1 | 1 | 1 | −1 | −1 | 1 | −1 | 1 | 1 | −1 | −1 | 1 | 1 | −1 |
| 28 | 1 | 1 | 1 | 1 | −1 | −1 | −1 | −1 | −1 | −1 | −1 | −1 | 1 | 1 | 1 | 1 |
| 29 | 1 | −1 | 1 | −1 | −1 | 1 | −1 | 1 | −1 | 1 | −1 | 1 | 1 | −1 | 1 | −1 |
| 30 | 1 | 1 | −1 | −1 | −1 | −1 | 1 | 1 | −1 | −1 | 1 | 1 | 1 | 1 | −1 | −1 |
| 31 | 1 | −1 | −1 | 1 | −1 | 1 | 1 | −1 | −1 | 1 | 1 | −1 | 1 | −1 | −1 | 1 |

As another example, the uplink demodulation reference sequence having a third length is a CGS sequence. The sequence can be searched for according to the following rules: (1) satisfying certain Cubic Metric (CM) characteristics, (2) satisfying a certain cross-correlation, and (3) being based on Quadrature Phase Shift Keying (QPSK) symbols. In an example, assuming that the length of the uplink demodulation reference sequence having the third length is 6, the sequence obtained by searching can be $\bar{r}_{u,v}(n) = e^{j\varphi(n)\pi/4}$, $0 \leq n \leq 5$, where u is a sequence number and $\varphi(n)$ is shown in the table below.

TABLE 3

$\varphi(n)$ for the sequence length of 6

| u | $\varphi(0), \ldots, \varphi(5)$ | | | | | |
|---|---|---|---|---|---|---|
| 0 | −3 | 3 | −3 | −1 | 3 | 1 |
| 1 | 1 | −3 | −1 | −3 | 1 | 1 |
| 2 | 1 | 3 | 1 | −3 | −3 | 1 |
| 3 | −1 | 1 | −3 | 1 | 1 | 1 |
| 4 | 1 | 1 | −1 | 3 | −1 | 1 |
| 5 | 1 | −1 | 3 | −1 | 1 | 1 |
| 6 | −3 | −1 | −3 | 3 | −1 | 1 |

TABLE 3-continued $\varphi(n)$ for the sequence length of 6

| u | $\varphi(0), \ldots, \varphi(5)$ | | | | | |
|---|---|---|---|---|---|---|
| 7 | 3 | 1 | 1 | 1 | −3 | 1 |
| 8 | −3 | −1 | −1 | −1 | −3 | 1 |
| 9 | 1 | 3 | 3 | 1 | −1 | 1 |

TABLE 3-continued $\varphi(n)$ for the sequence length of 6

| u | $\varphi(0), \ldots, \varphi(5)$ | | | | | |
|---|---|---|---|---|---|---|
| 10 | −1 | 3 | 1 | 3 | 1 | 1 |
| 11 | −1 | −3 | 3 | 3 | −3 | 1 |
| 12 | −3 | −3 | 1 | 1 | −1 | 1 |
| 13 | −1 | 3 | −1 | −1 | −1 | 1 |
| 14 | 1 | 1 | −3 | −1 | −3 | 1 |
| 15 | 1 | −1 | 1 | 3 | 3 | 1 |

When the sequence length is 3, the sequence obtained by searching can be $\bar{r}_{u,v}(n) = e^{j\varphi(n)\pi/4}$, $0 \leq n \leq 2$, where u is a sequence number and $\varphi(n)$ is shown in Tables 4~8 below. The numbers of the sequence numbers in Tables 4~8 are 3, 4, 6, 8 and 16, respectively.

TABLE 4

φ(n) for the sequence length of 3

| u | φ(0), . . . , φ(2) | | |
|---|---|---|---|
| 0 | −1 | −3 | −1 |
| 1 | 3 | 1 | 3 |
| 2 | 1 | −1 | 1 |

TABLE 5

φ(n) for the sequence length of 3

| u | φ(0), . . . , φ(2) | | |
|---|---|---|---|
| 0 | 1 | −3 | −3 |
| 1 | 1 | 1 | 3 |
| 2 | −3 | 3 | −3 |
| 3 | −3 | −1 | −3 |

TABLE 6

φ(n) for the sequence length of 3

| u | φ(0), . . . , φ(2) | | |
|---|---|---|---|
| 0 | 1 | −3 | −3 |
| 1 | 3 | −1 | −1 |
| 2 | 1 | 1 | −3 |
| 3 | 3 | 3 | −1 |
| 4 | −3 | −1 | −3 |
| 5 | −1 | 1 | −1 |

TABLE 7

φ(n) for the sequence length of 3

| u | φ(0), . . . , φ(2) | | |
|---|---|---|---|
| 0 | 1 | −3 | −3 |
| 1 | 3 | −1 | −1 |
| 2 | 1 | 1 | −3 |
| 3 | 3 | 3 | −1 |
| 4 | −1 | −1 | −3 |
| 5 | −3 | −1 | −3 |
| 6 | −1 | 1 | −1 |
| 7 | 3 | −3 | 3 |

TABLE 8

φ(n) for the sequence length of 3

| u | φ(0), . . . , φ(2) | | |
|---|---|---|---|
| 0 | −3 | −3 | 1 |
| 1 | −1 | −1 | 3 |
| 2 | 1 | 1 | −3 |
| 3 | 3 | 3 | −1 |
| 4 | −3 | −1 | −3 |
| 5 | 3 | −3 | 3 |
| 6 | 1 | 3 | 1 |
| 7 | −1 | 1 | −1 |
| 8 | 1 | −1 | 1 |
| 9 | 3 | 1 | 3 |
| 10 | −3 | 3 | −3 |
| 11 | −1 | −3 | −1 |
| 12 | −3 | 1 | 1 |
| 13 | 1 | −3 | −3 |
| 14 | −1 | 3 | 3 |
| 15 | 3 | −1 | −1 |

When the number of sub-carriers corresponding to the first time-frequency unit is 12, the uplink demodulation reference signal can be obtained according to the existing scheme for generating the uplink demodulation reference sequence in the LTE.

In this embodiment, when the first time-frequency unit includes a plurality of sub-carriers in the frequency domain, the uplink demodulation reference signal is mapped to the first time-frequency position of the first time-frequency unit. The first time-frequency unit includes a plurality of third sub-units of the first time-frequency unit. In this embodiment, the frequency-domain position and the time-frequency position of the first time-frequency position are as follows.

In this embodiment, there are several cases for the frequency domain of the time-frequency position.

In a first case, the first time-frequency position includes, in the frequency domain, all of the sub-carriers corresponding to the first time-frequency unit.

In a second case, the first time-frequency position includes, in the frequency domain, all sub-carriers in an uplink system.

In a third case, the first time-frequency position includes, in the frequency domain, one of the sub-carriers corresponding to the first time-frequency unit.

In a fourth case, when the number of sub-carriers in the first time-frequency unit is 12, the first time-frequency position includes, in the frequency domain, all of the sub-carriers corresponding to the first time-frequency unit.

In a fifth case, when the number of sub-carriers in the first time-frequency unit is smaller than 12, the first time-frequency position includes, in the frequency domain, one of the sub-carriers corresponding to the first time-frequency unit.

When the first time-frequency position includes, in the frequency domain, one of the sub-carriers corresponding to the first time-frequency unit, a frequency-domain position of the one sub-carrier in the first time-frequency unit is determined based on one or more of a cell index, a subframe index, a radio frame index and a slot index, or based on signaling. When the first time-frequency position includes, in the frequency domain, one of the sub-carriers corresponding to the first time-frequency unit, the uplink demodulation reference signal can be generated according to the schemes for generating the uplink demodulation reference signal in the embodiments described above in connection with FIG. 3 or 4.

In this embodiment, there are several cases for the time domain of the time-frequency position.

In a first case, the first time-frequency position includes, in time domain, a number, N, of OFDM symbols in the middle of each fourth sub-unit in the first time-frequency unit.

In a second case, the first time-frequency position includes, in the time domain, a number, N, of OFDM symbols uniformly distributed, in groups of P, over each fourth sub-unit in the first time-frequency unit.

The above N and P are both positive integers. Moreover, respective positions of the P OFDM symbols in first time-frequency position in the time domain are determined based at least on one or more of a cell index, a subframe index and a radio frame index.

Some examples will be given below for explaining several possible cases of the first time-frequency position when the first time-frequency unit includes a plurality of sub-carriers in the frequency domain. In the following examples, it is assumed that the sub-carrier spacing of the uplink system is 15 KHz, the number of sub-carriers in the uplink system is 12 and the ratio of the uplink demodulation reference signal to the uplink data is 1:6.

In a first case, the first time-frequency position includes, in the frequency domain, all of the sub-carriers corresponding to the first time-frequency unit.

It is assumed that the first time-frequency position includes, in time domain, N OFDM symbols in the middle of each fourth sub-unit in the first time-frequency unit.

Figure 10:
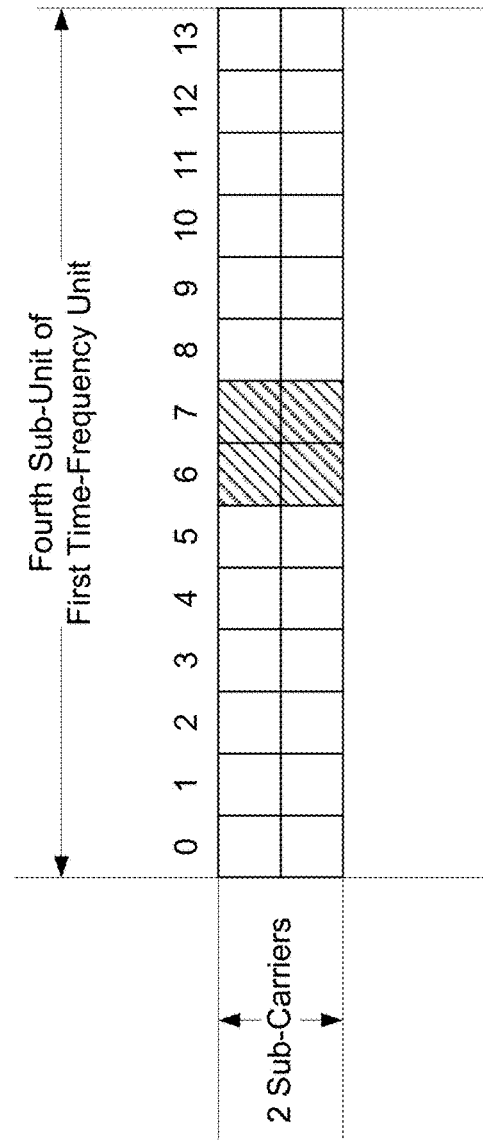
FIG. 10 is a schematic diagram showing another first time-frequency unit in the method for signal transmission provided in the embodiment as shown in FIG. 8.

For example, FIG. 10 is a schematic diagram showing another first time-frequency unit in the method for signal transmission provided in the embodiment as shown in FIG. 8. FIG. 10 shows all (i.e., 2) sub-carriers in the frequency domain and 1 subframe in the time domain in the first time-frequency unit. The ratio of the uplink demodulation reference signal to the uplink data is 1:6. A continuous mapping is applied in the frequency domain. In the time domain, N=2 and the two symbols are continuous. As shown in FIG. 10, the first time-frequency position includes, in the frequency domain, all of the sub-carriers corresponding to the first time-frequency unit and, in time domain, 2 OFDM symbols in the middle of the fourth sub-unit in the first time-frequency unit (i.e., the $6^{th}$ and $7^{th}$ OFDM symbols, the symbols being numbered from 0).

Figure 11:
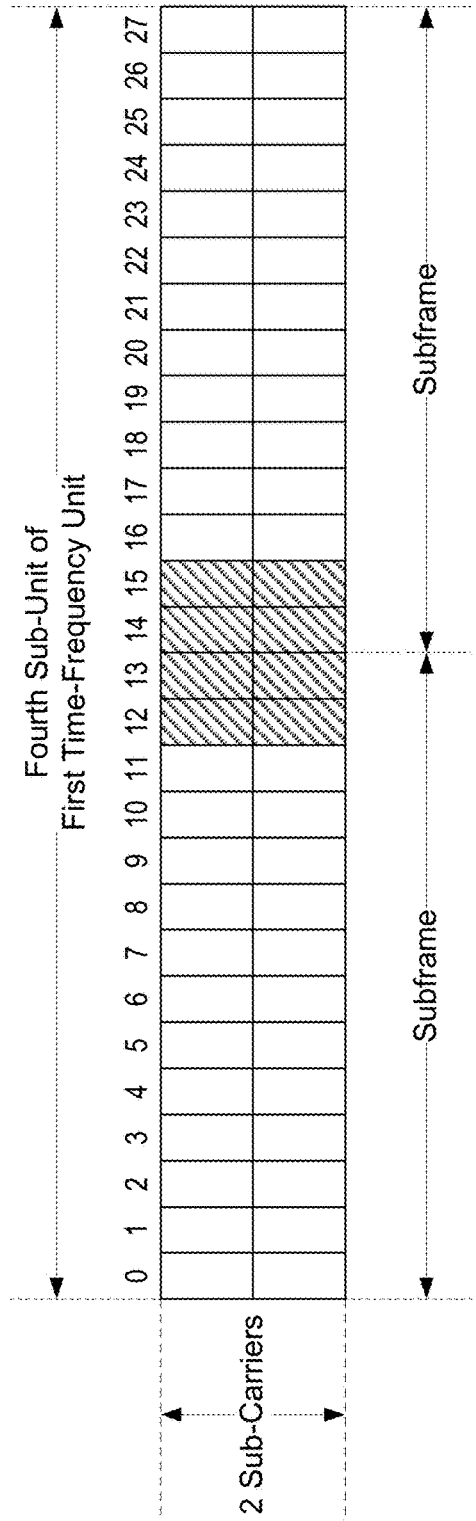
FIG. 11 is a schematic diagram showing yet another first time-frequency unit in the method for signal transmission provided in the embodiment as shown in FIG. 8.

As another example, FIG. 11 is a schematic diagram showing yet another first time-frequency unit in the method for signal transmission provided in the embodiment as shown in FIG. 8. FIG. 11 shows all (i.e., 2) sub-carriers in the frequency domain and 2 subframes in the time domain in the first time-frequency unit. The ratio of the uplink demodulation reference signal to the uplink data is 1:6. A continuous mapping is applied in the frequency domain. In the time domain, N=4 and the four symbols are continuous. As shown in FIG. 11, the first time-frequency position includes, in the frequency domain, all of the sub-carriers corresponding to the first time-frequency unit and, in time domain, 4 OFDM symbols in the middle of the fourth sub-unit in the first time-frequency unit (i.e., the $12^{th}$, $13^{th}$, $14^{th}$ and $15^{th}$ OFDM symbols, the symbols being numbered from 0).

It is assumed that the first time-frequency position includes, in the time domain, N OFDM symbols uniformly distributed, in groups of P, over each fourth sub-unit in the first time-frequency unit.

Figure 12:
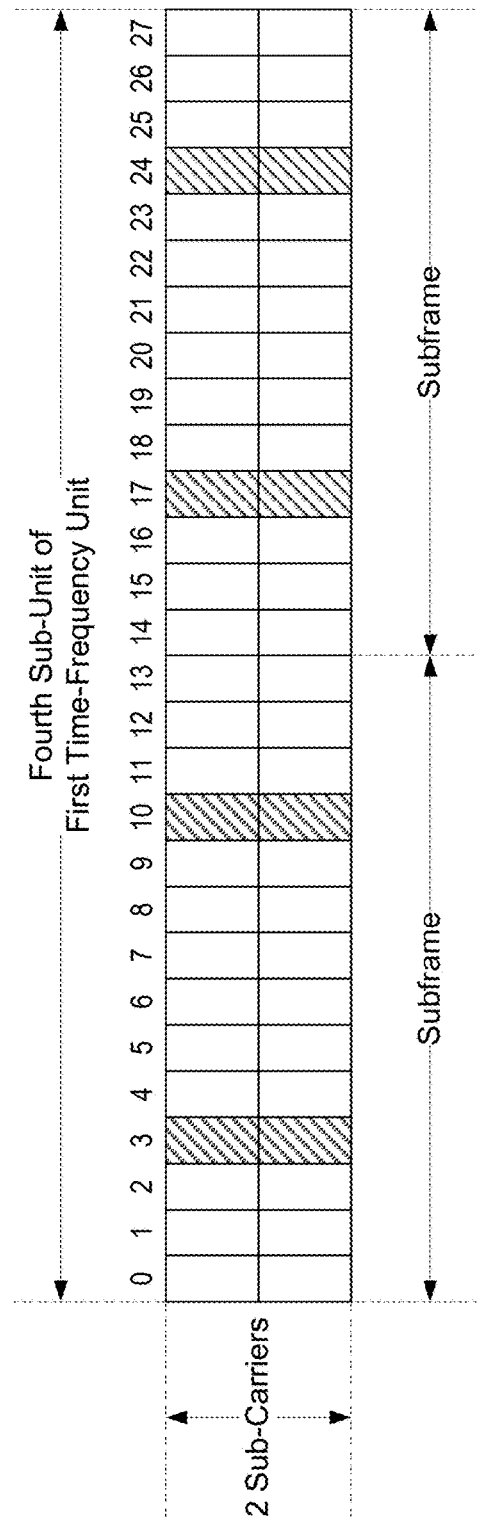
FIG. 12 is a schematic diagram showing yet another first time-frequency unit in the method for signal transmission provided in the embodiment as shown in FIG. 8.

For example, FIG. 12 is a schematic diagram showing yet another first time-frequency unit in the method for signal transmission provided in the embodiment as shown in FIG. 8. FIG. 12 shows all (i.e., 2) sub-carriers in the frequency domain and 2 subframes in the time domain in the first time-frequency unit. The ratio of the uplink demodulation reference signal to the uplink data is 1:6. A continuous mapping is applied in the frequency domain. In the time domain, N=4 and 4 OFDM symbols are uniformly distributed, in groups of P=1, over the fourth sub-unit in the first time-frequency unit. As shown in FIG. 12, the first time-frequency position includes, in the frequency domain, all of the sub-carriers corresponding to the first time-frequency unit and, in time domain, 4 OFDM symbols in the middle of the fourth sub-unit in the first time-frequency unit (i.e., the $3^{rd}$, $10^{th}$, $17^{th}$ and $24^{th}$ OFDM symbols, the symbols being numbered from 0).

Figure 13:
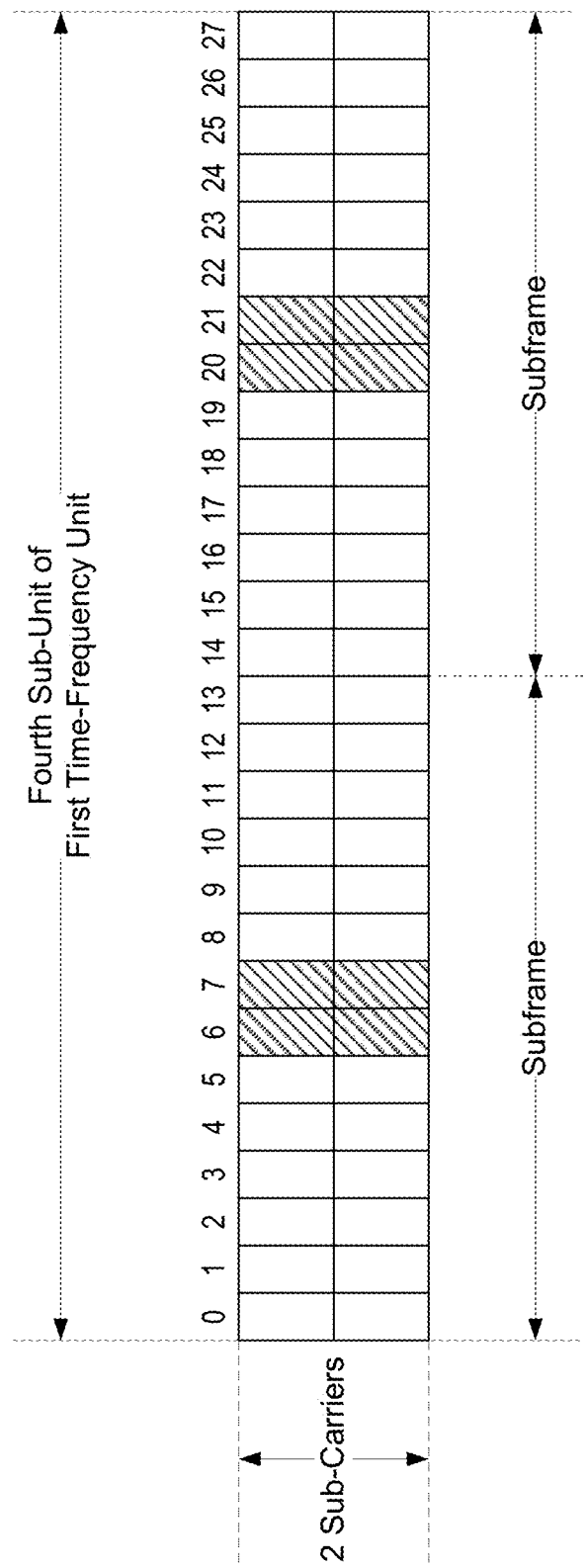
FIG. 13 is a schematic diagram showing yet another first time-frequency unit in the method for signal transmission provided in the embodiment as shown in FIG. 8.

As another example, FIG. 13 is a schematic diagram showing yet another first time-frequency unit in the method for signal transmission provided in the embodiment as shown in FIG. 8. FIG. 13 shows all (i.e., 2) sub-carriers in the frequency domain and 2 subframes in the time domain in the first time-frequency unit. The ratio of the uplink demodulation reference signal to the uplink data is 1:6. A continuous mapping is applied in the frequency domain. In the time domain, N=4 and 4 OFDM symbols are uniformly distributed, in groups of P=2, over the fourth sub-unit in the first time-frequency unit. As shown in FIG. 13, the first time-frequency position includes, in the frequency domain, all of the sub-carriers corresponding to the first time-frequency unit and, in time domain, 4 OFDM symbols in the middle of the fourth sub-unit in the first time-frequency unit (i.e., the $6^{th}$, $7^{th}$, $20^{th}$ and $21^{st}$ OFDM symbols, the symbols being numbered from 0).

It is assumed that the first time-frequency position includes, in the time domain, N OFDM symbols uniformly distributed, in groups of P, over each fourth sub-unit in the first time-frequency unit.

Figure 14:
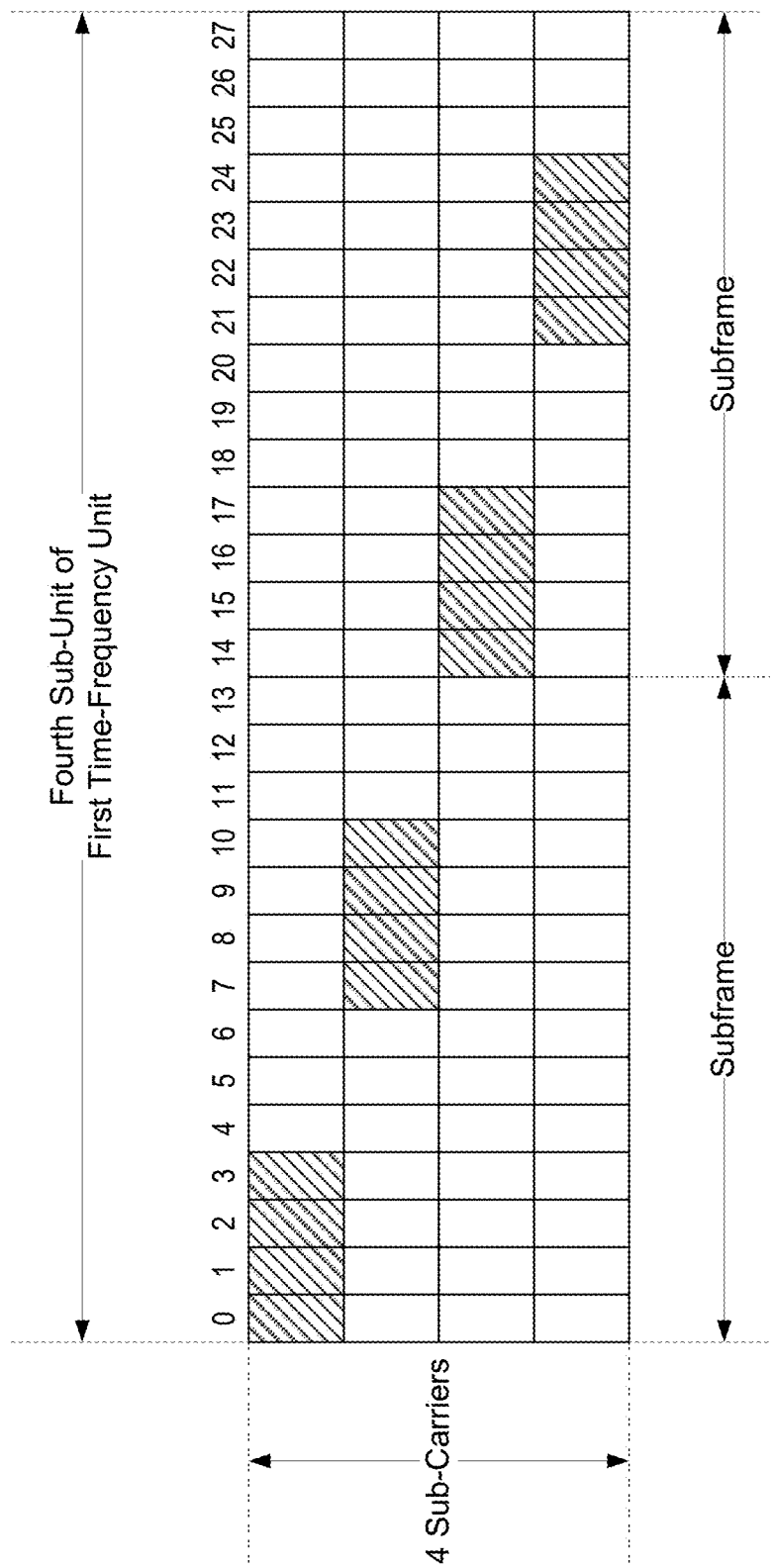
FIG. 14 is a schematic diagram showing yet another first time-frequency unit in the method for signal transmission provided in the embodiment as shown in FIG. 8.

As another example, FIG. 14 is a schematic diagram showing yet another first time-frequency unit in the method for signal transmission provided in the embodiment as shown in FIG. 8. FIG. 14 shows all (i.e., 4) sub-carriers in the frequency domain and 2 subframes in the time domain in the first time-frequency unit. The ratio of the uplink demodulation reference signal to the uplink data is 1:6. A discrete mapping in groups of Q=1 is applied in the frequency domain and a continuous mapping is applied in the time domain. As shown in FIG. 14, the mapping is performed in groups of {1 subframe in the frequency domain, 4 symbols in the time domain}.

Figure 15:
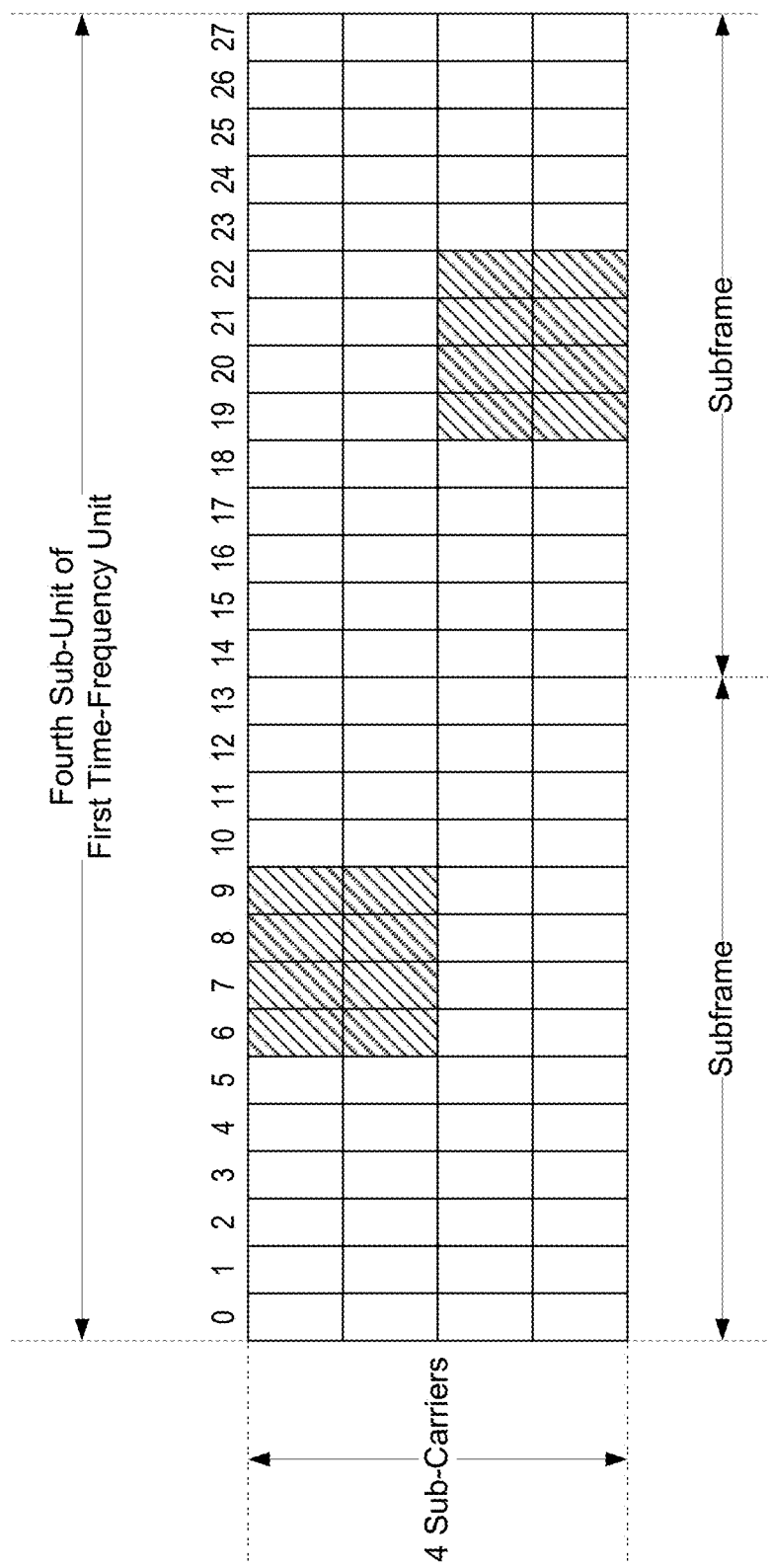
FIG. 15 is a schematic diagram showing yet another first time-frequency unit in the method for signal transmission provided in the embodiment as shown in FIG. 8.

As another example, FIG. 15 is a schematic diagram showing yet another first time-frequency unit in the method for signal transmission provided in the embodiment as shown in FIG. 8. FIG. 15 shows all (i.e., 4) sub-carriers in the frequency domain and 2 subframes in the time domain in the first time-frequency unit. The ratio of the uplink demodulation reference signal to the uplink data is 1:6. A discrete mapping in groups of Q=2 is applied in the frequency domain and a continuous mapping is applied in the time domain. As shown in FIG. 15, the mapping is performed in groups of {2 subframes in the frequency domain, 4 symbols in the time domain}.

Figure 16:
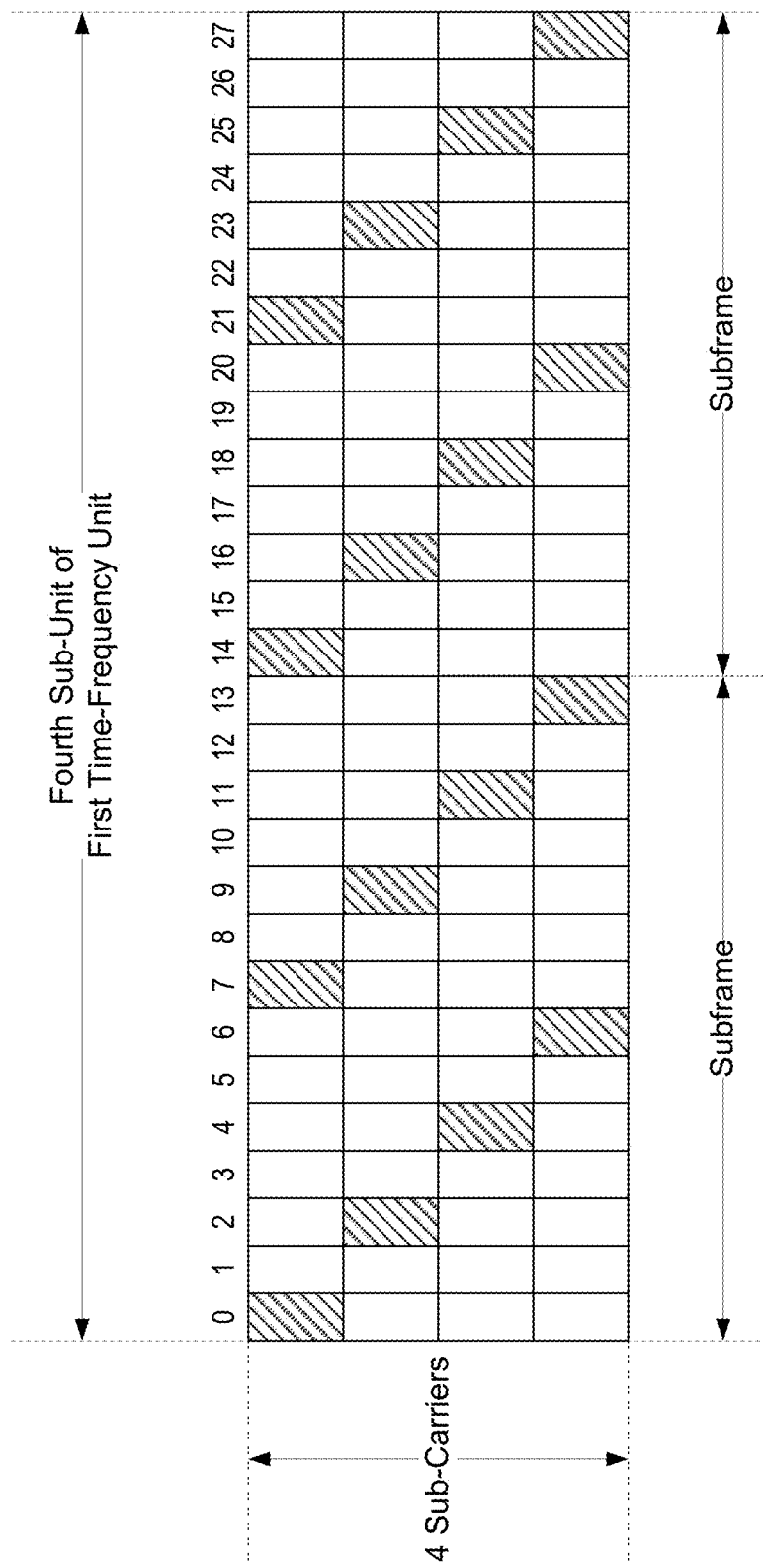
FIG. 16 is a schematic diagram showing yet another first time-frequency unit in the method for signal transmission provided in the embodiment as shown in FIG. 8.

As another example, FIG. 16 is a schematic diagram showing yet another first time-frequency unit in the method for signal transmission provided in the embodiment as shown in FIG. 8. FIG. 16 shows all (i.e., 4) sub-carriers in the frequency domain and 2 subframes in the time domain in the first time-frequency unit. The ratio of the uplink demodulation reference signal to the uplink data is 1:6. A discrete mapping in groups of Q=1 is applied in the frequency domain. In the time domain, 4 OFDM symbols are uniformly distributed, in groups of P=1, over the fourth sub-unit in the first time-frequency unit. As shown in FIG. 16, the mapping is performed in groups of {1 subframe in the frequency domain, 1 symbol in the time domain}.

Figure 17:
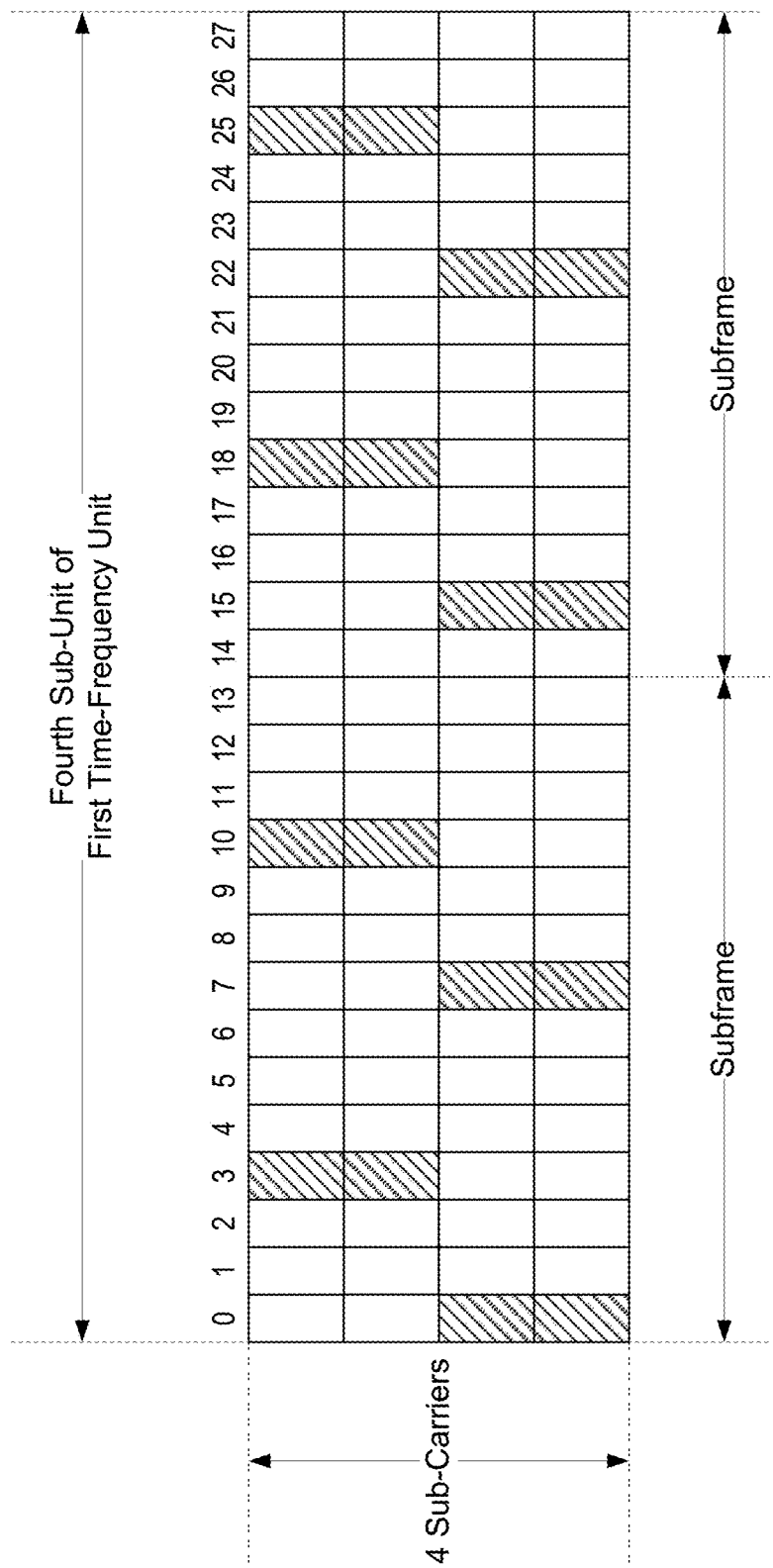
FIG. 17 is a schematic diagram showing yet another first time-frequency unit in the method for signal transmission provided in the embodiment as shown in FIG. 8.

As another example, FIG. 17 is a schematic diagram showing yet another first time-frequency unit in the method for signal transmission provided in the embodiment as shown in FIG. 8. FIG. 17 shows all (i.e., 4) sub-carriers in the frequency domain and 2 subframes in the time domain in the first time-frequency unit. The ratio of the uplink demodulation reference signal to the uplink data is 1:6. A discrete mapping in groups of Q=2 is applied in the frequency domain. In the time domain, 4 OFDM symbols are uniformly distributed, in groups of P=1, over the fourth sub-unit in the first time-frequency unit. As shown in FIG. 17, the mapping is performed in groups of {2 subframes in the frequency domain, 1 symbol in the time domain}.

Figure 18:
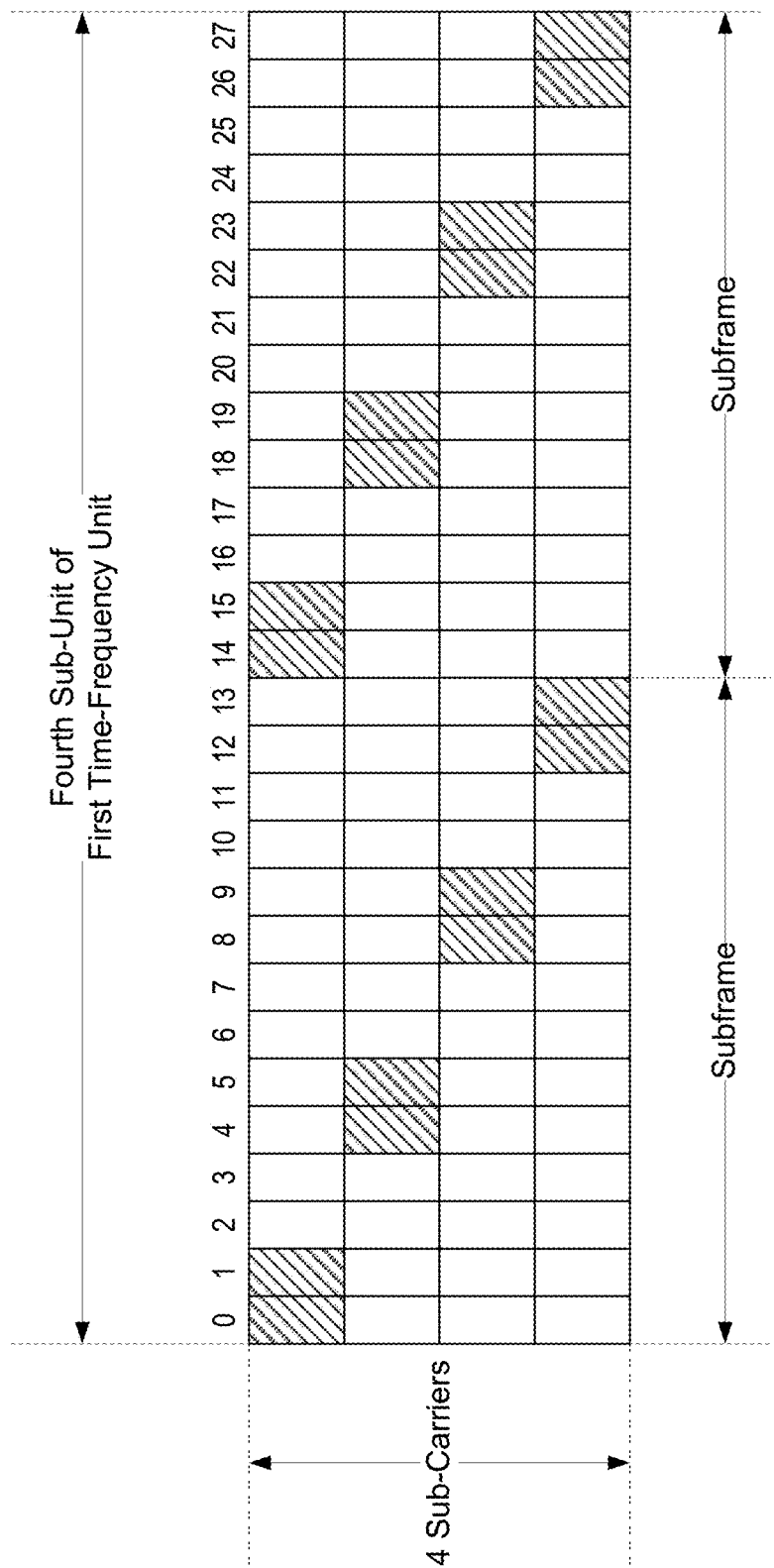
FIG. 18 is a schematic diagram showing yet another first time-frequency unit in the method for signal transmission provided in the embodiment as shown in FIG. 8.

As another example, FIG. 18 is a schematic diagram showing yet another first time-frequency unit in the method for signal transmission provided in the embodiment as shown in FIG. 8. FIG. 18 shows all (i.e., 4) sub-carriers in the frequency domain and 2 subframes in the time domain in the first time-frequency unit. The ratio of the uplink demodulation reference signal to the uplink data is 1:6. A discrete mapping in groups of Q=1 is applied in the frequency domain. In the time domain, 4 OFDM symbols are uniformly distributed, in groups of P=2, over the fourth sub-unit in the first time-frequency unit. As shown in FIG. 18, the mapping is performed in groups of {1 subframe in the frequency domain, 2 symbols in the time domain}.

Figure 19:
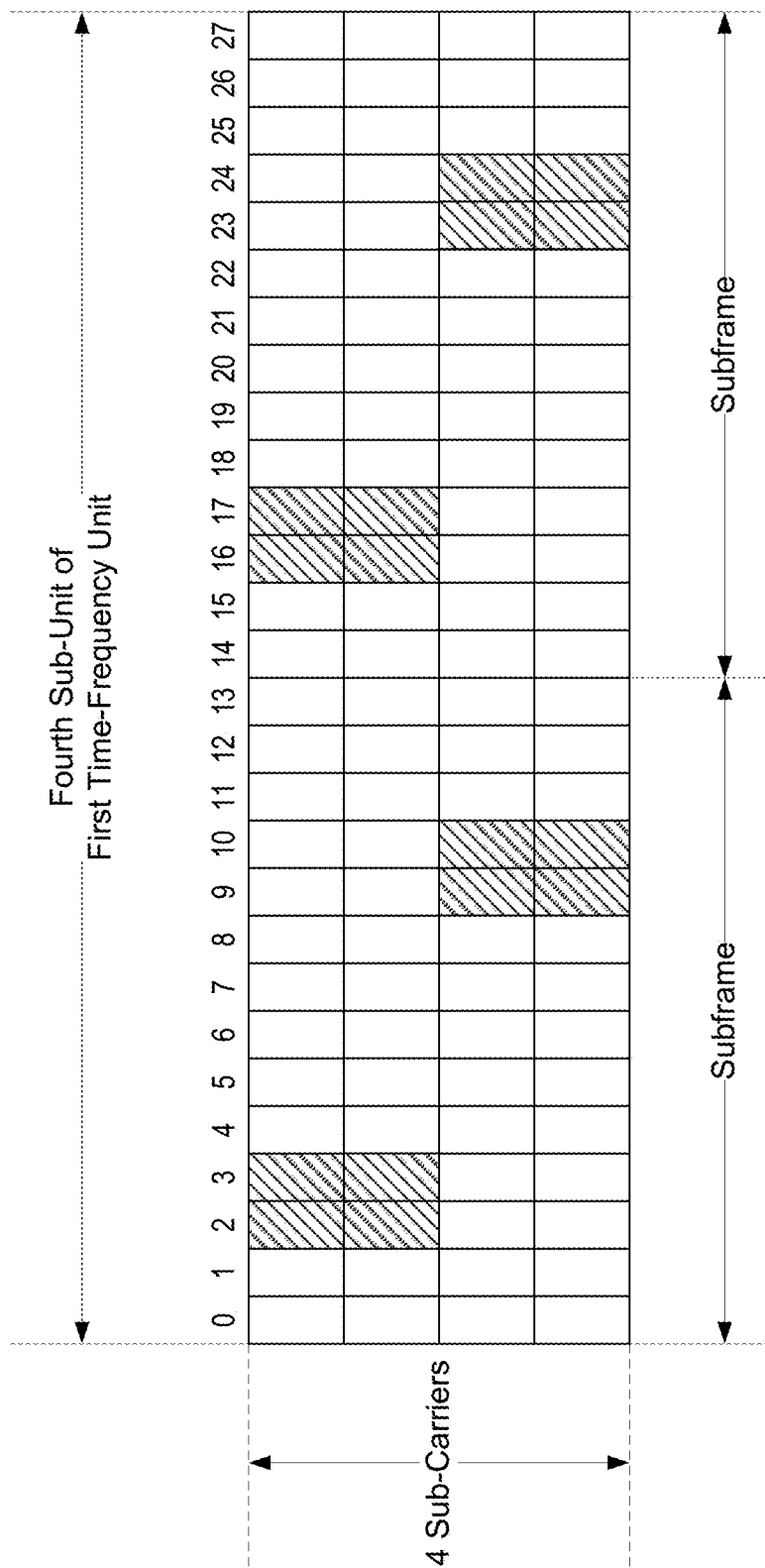
FIG. 19 is a schematic diagram showing yet another first time-frequency unit in the method for signal transmission provided in the embodiment as shown in FIG. 8.

As another example, FIG. 19 is a schematic diagram showing yet another first time-frequency unit in the method for signal transmission provided in the embodiment as shown in FIG. 8. FIG. 19 shows all (i.e., 4) sub-carriers in the frequency domain and 2 subframes in the time domain in the first time-frequency unit. The ratio of the uplink demodulation reference signal to the uplink data is 1:6. A discrete mapping in groups of Q=2 is applied in the frequency domain. In the time domain, 4 OFDM symbols are uniformly distributed, in groups of P=2, over the fourth sub-unit in the first time-frequency unit. As shown in FIG. 19, the mapping is performed in groups of {2 subframes in the frequency domain, 2 symbols in the time domain}.

In a second case, the first time-frequency position includes, in the frequency domain, all sub-carriers in an uplink system.

It is assumed that the first time-frequency position includes, in time domain, N OFDM symbols in the middle of each fourth sub-unit in the first time-frequency unit.

Figure 20:
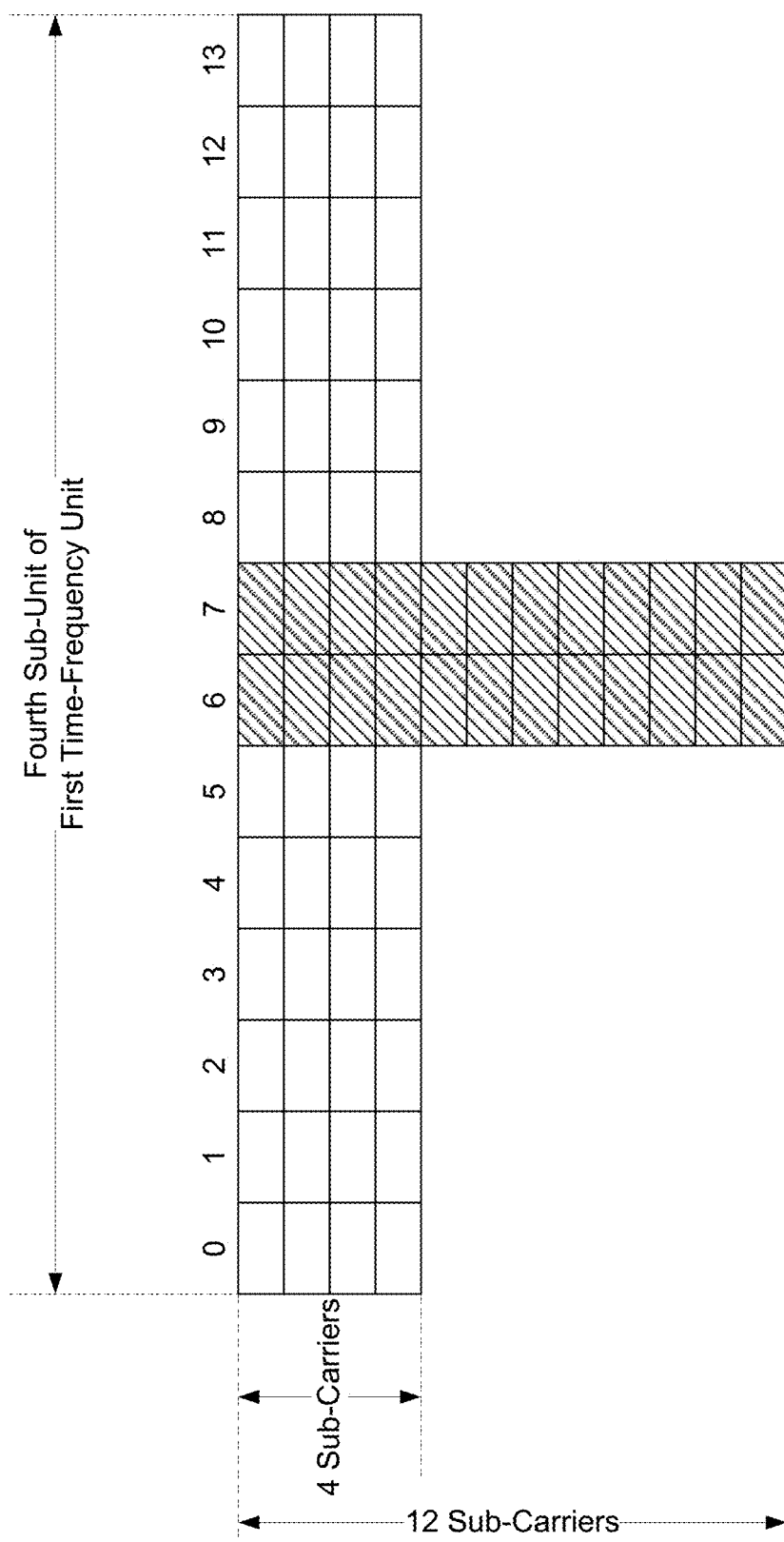
FIG. 20 is a schematic diagram showing yet another first time-frequency unit in the method for signal transmission provided in the embodiment as shown in FIG. 8.

As another example, FIG. 20 is a schematic diagram showing yet another first time-frequency unit in the method for signal transmission provided in the embodiment as shown in FIG. 8. FIG. 20 shows all (i.e., 12) sub-carriers in the frequency domain and 1 subframe in the time domain in the first time-frequency unit. In the frequency domain, the total number of sub-carriers in the uplink system is included. A mapping in groups of Q=12 is applied in the frequency domain and a continuous mapping is applied in the time domain, as shown in FIG. 20.

It is assumed that the first time-frequency position includes, in the time domain, N OFDM symbols uniformly distributed, in groups of P, over each fourth sub-unit in the first time-frequency unit.

Figure 21:
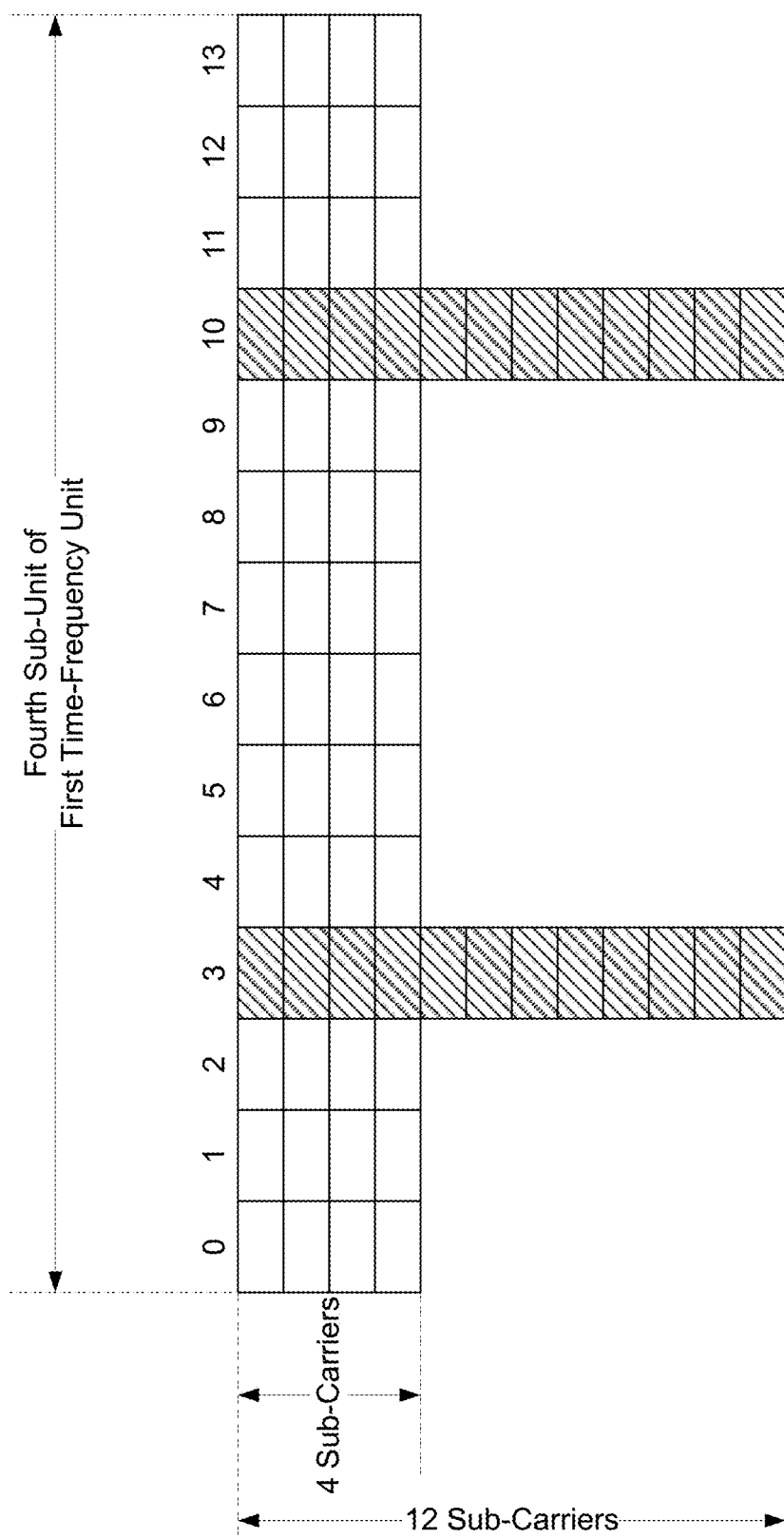
FIG. 21 is a schematic diagram showing yet another first time-frequency unit in the method for signal transmission provided in the embodiment as shown in FIG. 8.

As another example, FIG. 21 is a schematic diagram showing yet another first time-frequency unit in the method for signal transmission provided in the embodiment as shown in FIG. 8. FIG. 21 shows all (i.e., 12) sub-carriers in the frequency domain and 1 subframe in the time domain in the first time-frequency unit. In the frequency domain, the total number of sub-carriers in the uplink system is included. A mapping in groups of Q=12 is applied in the frequency domain. In the time domain, 4 OFDM symbols are uniformly distributed, in groups of P=1, over the fourth sub-unit in the first time-frequency unit, as shown in FIG. 21.

In a third case, the first time-frequency position includes, in the frequency domain, one of the sub-carriers corresponding to the first time-frequency unit.

It is assumed that the first time-frequency position includes, in time domain, N OFDM symbols in the middle of each fourth sub-unit in the first time-frequency unit.

Figure 22:
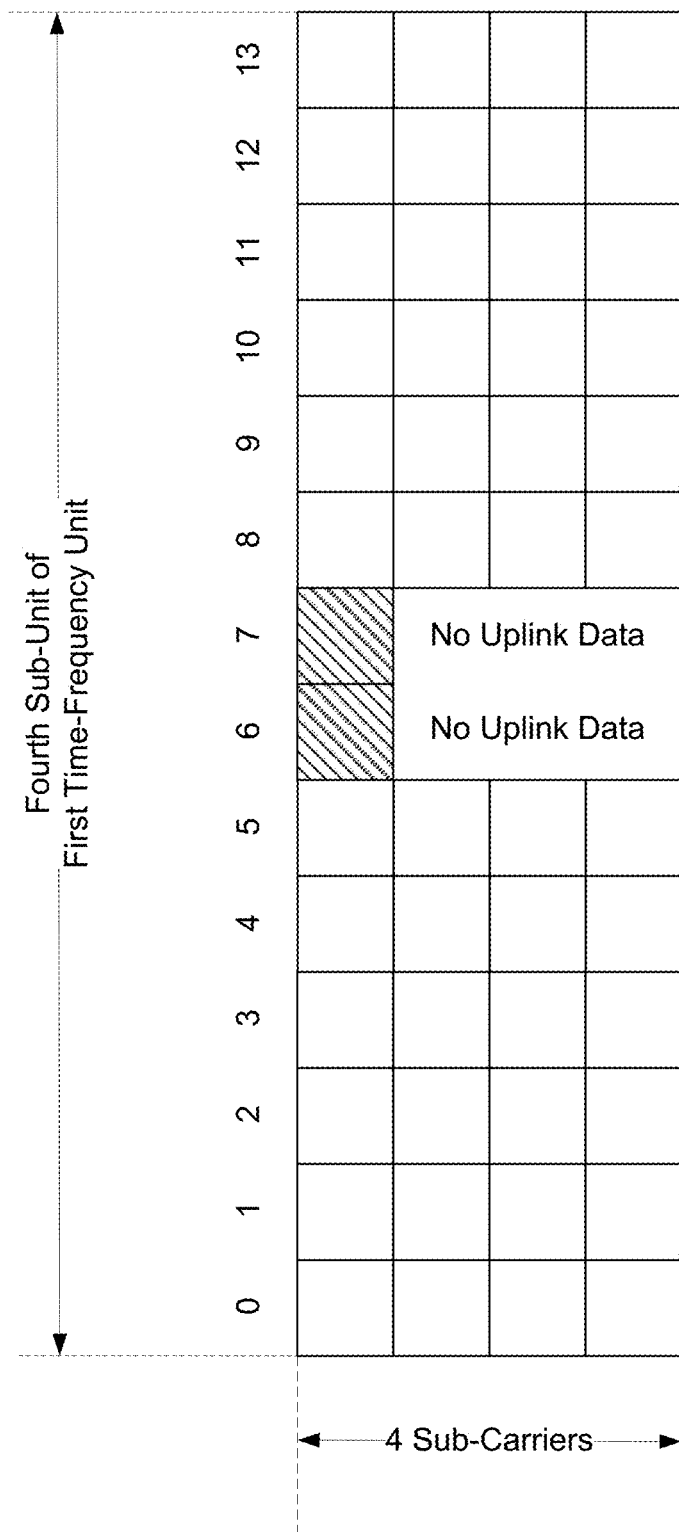
FIG. 22 is a schematic diagram showing yet another first time-frequency unit in the method for signal transmission provided in the embodiment as shown in FIG. 8.

For example, FIG. 22 is a schematic diagram showing yet another first time-frequency unit in the method for signal transmission provided in the embodiment as shown in FIG. 8. FIG. 22 shows all (i.e., 4) sub-carriers in the frequency domain and 1 subframe in the time domain in the first time-frequency unit. In the frequency domain, one sub-carrier in the first time-frequency unit, e.g., the sub-carrier having an index of 1, is included. In the time domain, N=2 and a continuous mapping is applied, as shown in FIG. 22.

It is assumed that the first time-frequency position includes, in the time domain, N OFDM symbols uniformly distributed, in groups of P, over each fourth sub-unit in the first time-frequency unit.

Figure 23:
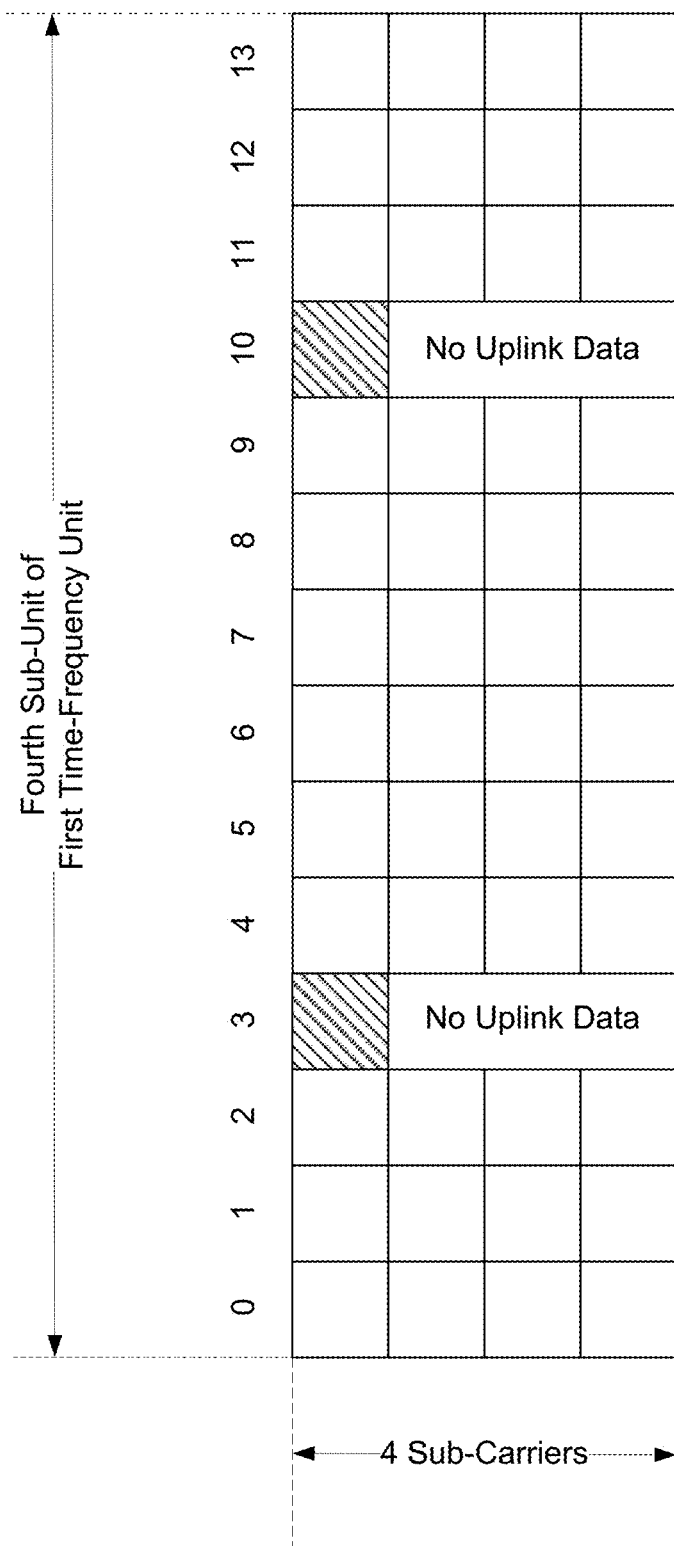
FIG. 23 is a schematic diagram showing yet another first time-frequency unit in the method for signal transmission provided in the embodiment as shown in FIG. 8.

For example, FIG. 23 is a schematic diagram showing yet another first time-frequency unit in the method for signal transmission provided in the embodiment as shown in FIG. 8. FIG. 23 shows all (i.e., 4) sub-carriers in the frequency domain and 1 subframe in the time domain in the first time-frequency unit. In the frequency domain, one sub-carrier in the first time-frequency unit, e.g., the sub-carrier having an index of 1, is included. In the time domain, N OFDM symbols are uniformly distributed, in groups of P=2, over each fourth sub-unit in the first time-frequency unit, as shown in FIG. 23.

In a fourth case, when the number of sub-carriers in the first time-frequency unit is 12, the first time-frequency position includes, in the frequency domain, all of the sub-carriers corresponding to the first time-frequency unit. For example, when the number of sub-carriers in the first time-frequency unit is 12, the number of sub-carriers corresponding to the first time-frequency position in the frequency domain is also 12.

In a fifth case, when the number of sub-carriers in the first time-frequency unit is smaller than 12, the first time-frequency position includes, in the frequency domain, one of the sub-carriers corresponding to the first time-frequency unit. For example, when the number of sub-carriers in the first time-frequency unit is 12, the number of sub-carriers corresponding to the first time-frequency position in the frequency domain is 1.

In the examples shown in FIG. 22 and FIG. 23 where the first time-frequency unit includes a plurality of sub-carriers in the frequency domain, no uplink data is mapped to the frequency-domain position corresponding to the time-domain position of the fourth sub-unit in the first time-frequency unit to which the uplink demodulation reference signal is mapped. In both cases, the frequency-domain position(s) of the sub-carrier(s) where the uplink demodulation reference signal is located can be signaled to the terminal device by the base station, or can be preconfigured or dependent on an index of the terminal device or a cell index. Further, in the above embodiments of the present disclosure, the hatched blocks in the time-frequency unit as shown in FIGS. 5, 6 and 9-23 denote the uplink demodulation reference signal, while the unhatched blocks denote the uplink data. The positions where no uplink data is mapped in FIGS. 22-23 have been labeled with text.

The first time-frequency position in the first time-frequency unit to which the uplink demodulation reference signal is mapped when the first time-frequency unit includes a plurality of sub-carriers in the frequency domain as described above is only some mapping rules according to the embodiments of the present disclosure. The embodiments of the present disclosure are not limited to any mapping rule for the uplink demodulation reference signal. Any mapping rules that are capable of mapping the uplink demodulation reference signal and comply with a pre-configuration can be applied in the method for uplink signal transmission according to the embodiments of the present disclosure.

Figure 24:
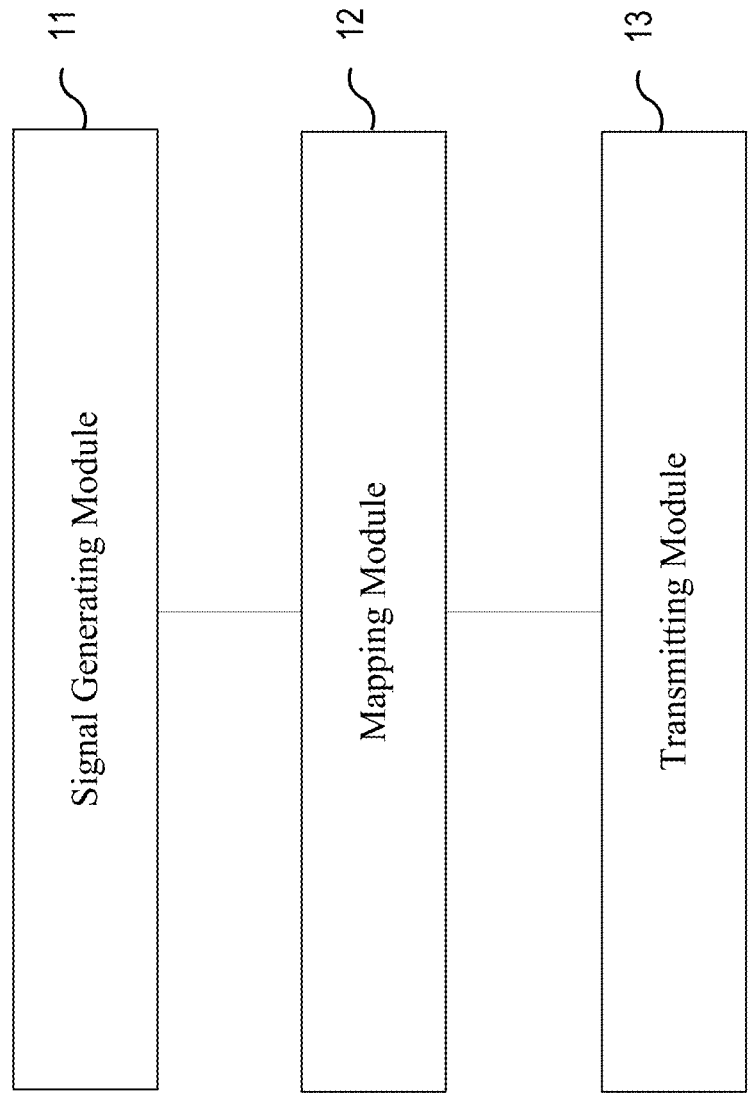
FIG. 24 is a schematic diagram showing an apparatus for uplink signal transmission according to an embodiment of the present disclosure.

FIG. 24 is a schematic diagram showing an apparatus for uplink signal transmission according to an embodiment of the present disclosure. The apparatus for uplink signal transmission according to this embodiment can be applied in a terminal device for transmitting an uplink demodulation reference signal. The apparatus for uplink signal transmission can be implemented in combination of software and hardware. The apparatus can be integrated into a processor of the terminal device for use by the processor. As shown in FIG. 24, the apparatus for uplink signal transmission according to this embodiment includes a signal generating module 11, a mapping module 12 and a transmitting module 13.

The signal generating module 11 is configured to generate an uplink demodulation reference signal to be transmitted within a first time-frequency unit. The first time-frequency unit includes one or more sub-carriers in frequency domain.

With the apparatus for uplink signal transmission according to this embodiment, it is possible to configure the positions for transmitting the uplink demodulation reference signal and the uplink data corresponding to the uplink demodulation reference signal properly. In the above embodiments, the scheduling unit for the uplink demodulation reference signal in the LTE/LTE-A technologies and why it cannot be applied in the NB-IoT system has been explained and details thereof will be omitted here.

The mapping module 12 is configured to map the uplink demodulation reference signal generated by the signal generating module to a first time-frequency position of the first time-frequency unit.

In this embodiment, the operation of mapping the uplink demodulation reference signal is to map the uplink demodulation reference signal to the first time-frequency position according to a ratio of the uplink demodulation reference signal to the uplink data corresponding to the uplink demodulation reference signal and a preconfigured mapping rule.

In an implementation of this embodiment, when the first time-frequency unit includes one or more sub-carriers, the sub-carrier spacing of the uplink system can be 15 KHz or a smaller sub-carrier spacing, e.g., 3.75 KHz. When the first time-frequency unit includes a plurality of sub-carriers, the sub-carrier spacing of the uplink system can be 15 KHz.

The transmitting module 13 is configured to transmit the uplink demodulation reference signal within the first time-frequency unit and uplink data corresponding to the uplink demodulation reference signal.

In this embodiment, there may be several cases of the first mapping position, for which reference can be made to the first time-frequency unit shown in FIGS. 2 and 6-8.

The apparatus for uplink signal transmission according to this embodiment can perform the method for uplink signal transmission according to the embodiment shown in FIG. 1 by providing the respective functional modules. The principles and technical effects of the apparatus are similar to those of the method and description thereof will be omitted here.

Figure 25:
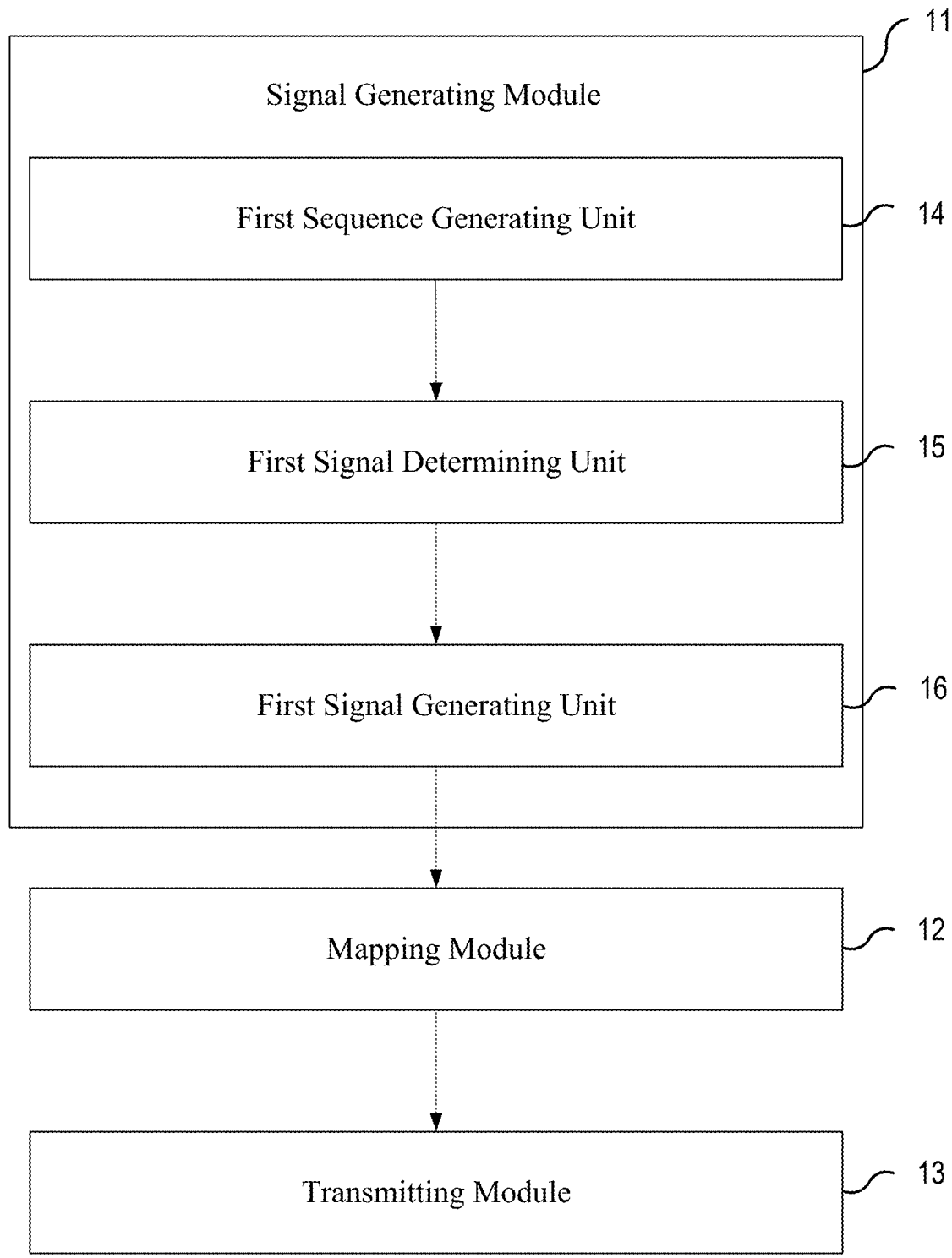
FIG. 25 is a schematic diagram showing an apparatus for uplink signal transmission according to another embodiment of the present disclosure.

FIG. 25 is a schematic diagram showing an apparatus for uplink signal transmission according to another embodiment of the present disclosure. In this embodiment, the first time-frequency unit includes one sub-carrier in the frequency domain. On the basis of the above embodiment shown in FIG. 24, in this embodiment, the signal generating module 11 includes: a first sequence generating unit 14 configured to generate an uplink demodulation reference sequence having a first length based at least on a bandwidth and a sub-carrier spacing of an uplink system; a first signal determining unit 15 configured to obtain an uplink demodulation reference signal corresponding to a first sub-unit of the first time-frequency unit from the uplink demodulation reference sequence having the first length as generated by the first sequence generating unit 14 based on a frequency-domain position of the first time-frequency unit; and a first signal generating unit 16 configured to generate the uplink demodulation reference signal to be transmitted within the first time-frequency unit by repeating or extending the uplink demodulation reference signal corresponding to the first sub-unit of the first time-frequency unit as obtained by the first signal determining unit 15.

The apparatus for uplink signal transmission according to this embodiment can perform the method for uplink signal transmission according to the embodiment shown in FIG. 3 by providing the respective functional modules. The principles and technical effects of the apparatus are similar to those of the method and description thereof will be omitted here.

The uplink demodulation reference signal can be generated by the above apparatus shown in FIG. 24. In this case, the signal generating module 11 is configured to generate an uplink demodulation reference sequence having a second length based on a number of resource elements occupied by the uplink demodulation reference signal within the first time-frequency unit. The uplink demodulation reference sequence having the second length is the uplink demodulation reference signal to be transmitted within the first time-frequency unit. In an alternative implementation of this embodiment, the signal generating module 11 includes: a second sequence generating unit configured to generate an uplink demodulation reference sequence having a second length based on a fixed length; and a second signal generating unit configured to generate the uplink demodulation reference signal to be transmitted within the first time-frequency unit by repeating, extending or truncating the uplink demodulation reference sequence having the second length as generated by the second sequence generating unit.

The apparatus for uplink signal transmission according to this embodiment can perform the method for uplink signal transmission according to the embodiment shown in FIG. 4 by providing the respective functional modules. The principles and technical effects of the apparatus are similar to those of the method and description thereof will be omitted here.

In the above embodiments, when the first time-frequency unit includes one sub-carrier in the frequency domain, the first time-frequency position is determined based on one or two of a corresponding second time-frequency position in each second sub-unit of the first time-frequency unit and a time-domain offset. In an implementation, there is typically a time-domain offset. Hence, in the embodiment of the present disclosure, the first time-frequency position can be determined based on one or two of the second time-frequency position and the time-domain offset. The time-domain offset can be determined based on one or more of a cell index, a subframe index, a radio frame index and a slot index.

There may be several possible cases of the second time-frequency position when the first time-frequency unit includes one sub-carrier in the frequency domain.

Case 1: When a sub-carrier spacing of an uplink system is a first spacing threshold and the second sub-unit of the first time-frequency unit has a length of 1 ms, the second time-frequency position is the third OFDM symbol in the second sub-unit of the first time-frequency unit. The second sub-unit of the first time-frequency unit includes 3 OFDM symbols.

Case 2: When a sub-carrier spacing of an uplink system is a first spacing threshold and the second sub-unit of the first time-frequency unit has a length of 2 ms, the second time-frequency position is the second or fourth OFDM symbol in the second sub-unit of the first time-frequency unit, and the second sub-unit of the first time-frequency unit includes 6 OFDM symbols. Alternatively, the second time-frequency position is the third or fifth OFDM symbol in the second sub-unit of the first time-frequency unit, and the second sub-unit of the first time-frequency unit includes 7 OFDM symbols.

Case 3: When a sub-carrier spacing of an uplink system is a first spacing threshold and the second sub-unit of the first time-frequency unit has a length of 4 ms, the second time-frequency position is the second and eighth OFDM symbols, or the fourth and tenth OFDM symbols, in the second sub-unit of the first time-frequency unit. The second sub-unit of the first time-frequency unit includes 12 OFDM symbols. Alternatively, the second time-frequency position is the third and tenth OFDM symbols, or the fifth and twelfth OFDM symbols, in the second sub-unit of the first time-frequency unit. The second sub-unit of the first time-frequency unit includes 14 OFDM symbols.

Examples of Cases 1~3 can be the same as those described in the above embodiments. Reference can be made to the first time-frequency unit and the second sub-unit of the first time-frequency unit shown in FIGS. 5 and 6.

When the first time-frequency unit includes a plurality of sub-carriers in the frequency domain, the uplink demodulation reference signal can also be generated by the above apparatus shown in FIG. 24. In this case, the signal generating module 11 includes: a third sequence generating unit configured to generate an uplink demodulation reference sequence having a third length based on a number of sub-carriers corresponding to the first time-frequency unit, the uplink demodulation reference sequence having the third length being an uplink demodulation reference signal corresponding to a third sub-unit of the first time-frequency unit; and a third signal generating unit configured to generate the uplink demodulation reference signal to be transmitted within the first time-frequency unit by repeating or extending the uplink demodulation reference signal corresponding to the third sub-unit of the first time-frequency unit as the third sequence generating unit.

In the above embodiments of the present disclosure, the operation of extending may include extending based on an orthogonal sequence having an index determined based at least on one or more of a cell index, a subframe index, a radio frame index, a slot index and a terminal index. The uplink demodulation reference sequence can have an index determined based at least on one or more of a cell index, a subframe index, a radio frame index, a slot index and a terminal index. The uplink demodulation reference sequence may typically include one or more of a Hadamard sequence, a Discrete Fourier Transform (DCT) sequence, a Constant Amplitude Zero Auto-Correlation (CAZAC) sequence, Zadoff-Chu (ZC) sequence, a pseudo-random sequence, a Computer Search Sequence (CGS) sequence and Peak to Average Power Ratio (PAPR) sequence.

In this embodiment, when the first time-frequency unit includes a plurality of sub-carriers in the frequency domain, the uplink demodulation reference signal is mapped to the first time-frequency position of the first time-frequency unit. The first time-frequency unit includes a plurality of third sub-units of the first time-frequency unit. In this embodiment, the frequency-domain position and the time-frequency position of the first time-frequency position are as follows.

In this embodiment, there are several cases for the frequency domain of the time-frequency position.

In a first case, the first time-frequency position includes, in the frequency domain, all of the sub-carriers corresponding to the first time-frequency unit.

In a second case, the first time-frequency position includes, in the frequency domain, all sub-carriers in an uplink system.

In a third case, the first time-frequency position includes, in the frequency domain, one of the sub-carriers corresponding to the first time-frequency unit.

In a fourth case, when the number of sub-carriers in the first time-frequency unit is 12, the first time-frequency position includes, in the frequency domain, all of the sub-carriers corresponding to the first time-frequency unit.

In a fifth case, when the number of sub-carriers in the first time-frequency unit is smaller than 12, the first time-frequency position includes, in the frequency domain, one of the sub-carriers corresponding to the first time-frequency unit.

When the first time-frequency position includes, in the frequency domain, one of the sub-carriers corresponding to the first time-frequency unit, a frequency-domain position of the one sub-carrier in the first time-frequency unit is determined based on one or more of a cell index, a subframe index, a radio frame index and a slot index, or based on signaling. When the first time-frequency position includes, in the frequency domain, one of the sub-carriers corresponding to the first time-frequency unit, the uplink demodulation reference signal can be generated according to the schemes for generating the uplink demodulation reference signal in the embodiments described above in connection with FIG. 3 or 4.

In this embodiment, there are several cases for the time domain of the time-frequency position.

In a first case, the first time-frequency position includes, in time domain, a number, N, of OFDM symbols in the middle of each fourth sub-unit in the first time-frequency unit.

In a second case, the first time-frequency position includes, in the time domain, a number, N, of OFDM symbols uniformly distributed, in groups of P, over each fourth sub-unit in the first time-frequency unit.

The above N and P are both positive integers. Moreover, respective positions of the P OFDM symbols in first time-frequency position in the time domain are determined based at least on one or more of a cell index, a subframe index and a radio frame index.

For examples of the above cases of the first time-frequency position in the frequency domain and the time domain, reference can be made to the first time-frequency unit and the first time-frequency position in the first time-frequency unit in the above embodiments shown in FIGS. 10-23. Some possible cases of the first time-frequency position have been illustrated in the above embodiments and description thereof will be omitted here.

In an embodiment of the present disclosure, a computer readable storage medium is provided. The computer readable storage medium stores computer executable instructions which, when executed by a processor, perform the method for uplink signal transmission as described above.

It can be appreciated by those skilled in the art that all or some of the steps in the methods disclosed above can be implemented in hardware (e.g., a processor) following instructions of a program. The program can be stored in a computer readable storage medium such as a Read Only Memory (ROM), a magnetic disk or an optical disc. Alternatively, all or some of the steps of the above embodiments can be implemented in one or more integrated circuits. Accordingly, the modules/units in the above embodiments can be implemented in hardware (e.g., the functions of the respective modules/units can be implemented by an integrated circuit) or software functional modules (e.g., the functions of the respective modules/units can be implemented by a processor executing programs/instructions stored in a memory). The present disclosure is not limited to any specific form of combination of hardware and software.

While the embodiments of the present disclosure have been described above, the foregoing is only embodiments for illustrating, rather than limiting, the present disclosure. Various modifications and alternatives in forms and details can be made by those skilled in the art without departing from the spirit and scope of the present disclosure. The scope of the present disclosure is defined only by the claims as attached.

INDUSTRIAL APPLICABILITY

With the method and apparatus for uplink signal transmission according to the embodiments of the present disclosure, an uplink demodulation reference signal to be transmitted within a first time-frequency unit is generated and mapped to a first time-frequency position of the first time-frequency unit. The uplink demodulation reference signal within the first time-frequency unit and uplink data corresponding to the uplink demodulation reference signal are transmitted. The first time-frequency unit includes one or more sub-carriers in frequency domain. In the solutions according to the embodiments of the present disclosure, with a proper design of transmission scheme for uplink data, an uplink demodulation reference signal can be scheduled for transmission in units of sub-carriers.

What is claimed is:

1. A method for wireless communication, comprising:
generating, at a mobile device, a demodulation reference signal for an uplink transmission;
mapping, by the mobile device, the demodulation reference signal to a set of time-frequency resources for the uplink transmission, the set of time-frequency resources comprising one or more subcarriers in frequency domain and a single Orthogonal Frequency Division Multiplexing (OFDM) symbol of individual slots in time domain; and
transmitting, by the mobile device, the demodulation reference signal to the base station using the set of time-frequency resources for the uplink transmission,
wherein a subcarrier spacing for the uplink transmission is 3.75 kHz and the single OFDM symbol is a fifth OFDM symbol of individual slots in time domain;
wherein the demodulation reference signal is determined based on a Hadamard sequence and a pseudo-random sequence.

2. The method of claim 1, wherein the uplink transmission includes uplink data.

3. A method for wireless communication, comprising:
generating, at a mobile device, a demodulation reference signal for an uplink transmission;
mapping, by the mobile device, the demodulation reference signal to a set of time-frequency resources for the uplink transmission, the set of time-frequency resources comprising one or more subcarriers in frequency domain and a single Orthogonal Frequency Division Multiplexing (OFDM) symbol of individual slots in time domain; and
transmitting, by the mobile device, the demodulation reference signal to the base station using the set of time-frequency resources for the uplink transmission,
wherein a subcarrier spacing for the uplink transmission is 15 kHz and the single OFDM symbol is a fourth OFDM symbol of individual slots in time domain;
wherein the demodulation reference signal is determined based on a Hadamard sequence and a pseudo-random sequence.

4. A method for wireless communication, comprising:
generating, at a mobile device, a demodulation reference signal for an uplink transmission;
mapping, by the mobile device, the demodulation reference signal to a set of time-frequency resources for the uplink transmission, the set of time-frequency resources comprising one or more subcarriers in frequency domain and three Orthogonal Frequency Division Multiplexing (OFDM) symbols of individual slots in time domain; and
transmitting, by the mobile device, the demodulation reference signal to the base station using the set of time-frequency resources for the uplink transmission,
wherein a subcarrier spacing for the uplink transmission is 3.75 kHz and wherein the three OFDM symbols are first, second and third symbols of individual slots in time domain;
wherein the demodulation reference signal is determined based on a Hadamard sequence and a pseudo-random sequence.

5. The method of claim 4, wherein the uplink transmission includes a Hybrid Automatic Repeat reQuest (HARQ) signal.

6. A method for wireless communication, comprising:
receiving, at a base station, a demodulation reference signal for a uplink transmission from a mobile device,
wherein the demodulation reference signal is mapped to a set of time-frequency resources of the uplink transmission, the set of time-frequency resources comprising one or more subcarriers in frequency domain and a single Orthogonal Frequency Division Multiplexing (OFDM) symbol of individual slots in time domain, and
wherein a subcarrier spacing for the uplink transmission is 3.75 kHz and the single OFDM symbol is a fifth OFDM symbol of individual slots in time domain;
wherein the demodulation reference signal is determined based on a Hadamard sequence and a pseudo-random sequence.

7. A method for wireless communication, comprising:
receiving, at a base station, a demodulation reference signal for a uplink transmission from a mobile device,
wherein the demodulation reference signal is mapped to a set of time-frequency resources of the uplink transmission, the set of time-frequency resources comprising one or more subcarriers in frequency domain and a single Orthogonal Frequency Division Multiplexing (OFDM) symbol of individual slots in time domain, and
wherein a subcarrier spacing for the uplink transmission is 15 kHz and the single OFDM symbol is a fourth OFDM symbol of individual slots in time domain;
wherein the demodulation reference signal is determined based on a Hadamard sequence and a pseudo-random sequence.

8. A method for wireless communication, comprising:
receiving, at a base station, a demodulation reference signal for a uplink transmission from a mobile device,
wherein the demodulation reference signal is mapped to a set of time-frequency resources of the uplink transmission, the set of time-frequency resources comprising one or more subcarriers in frequency domain and three Orthogonal Frequency Division Multiplexing (OFDM) symbols of individual slots in time domain, and wherein a subcarrier spacing for the uplink transmission is 3.75 kHz and wherein the three OFDM symbols are first, second and third symbols of individual slots in time domain;

wherein the demodulation reference signal is determined based on a Hadamard sequence and a pseudo-random sequence.

9. An apparatus for wireless communication, comprising:
a processor configured to:
generate a demodulation reference signal for an uplink transmission;
map the demodulation reference signal to a set of time-frequency resources for the uplink transmission, the set of time-frequency resources comprising one or more subcarriers in frequency domain and a single Orthogonal Frequency Division Multiplexing (OFDM) symbol of individual slots in time domain; and
a transmitter configured to transmit the demodulation reference signal to a base station using the set of time-frequency resources for the uplink transmission,
wherein a subcarrier spacing for the uplink transmission is 315 kHz and the single OFDM symbol is a fifth OFDM symbol of individual slots in time domain;
wherein the demodulation reference signal is determined based on a Hadamard sequence and a pseudo-random sequence.

10. An apparatus for wireless communication, comprising:
a processor configured to:
generate a demodulation reference signal for an uplink transmission;
map the demodulation reference signal to a set of time-frequency resources for the uplink transmission, the set of time-frequency resources comprising one or more subcarriers in frequency domain and a single Orthogonal Frequency Division Multiplexing (OFDM) symbol of individual slots in time domain; and
a transmitter configured to transmit the demodulation reference signal to a base station using the set of time-frequency resources for the uplink transmission,
wherein a subcarrier spacing for the uplink transmission is 15 kHz and the single OFDM symbol is a fourth OFDM symbol of individual slots in time domain;
wherein the demodulation reference signal is determined based on a Hadamard sequence and a pseudo-random sequence.

11. An apparatus for wireless communication, comprising:
a processor configured to;
generate a demodulation reference signal for an uplink transmission;
map the demodulation reference signal to a set of time-frequency resources for the uplink transmission, the set of time-frequency resources comprising one or more subcarriers in frequency domain and three Orthogonal Frequency Division Multiplexing (OFDM) symbols of individual slots in time domain; and
a transmitter configured to transmit the demodulation reference signal to a base station using the set of time-frequency resources for the uplink transmission,
wherein a subcarrier spacing for the uplink transmission is 3.75 kHz and wherein the three OFDM symbols are first, second and third symbols of individual slots in time domain;
wherein the demodulation reference signal is determined based on a Hadamard sequence and a pseudo-random sequence.

12. An apparatus for wireless communication, comprising:
a receiver configured to receive a demodulation reference signal for an uplink transmission from a base station, and
a processor configured to process the demodulation reference signal,
wherein the demodulation reference signal is mapped to a set of time-frequency resources for the uplink transmission, the set of time-frequency resources comprising one or more subcarriers in frequency domain and a single Orthogonal Frequency Division Multiplexing (OFDM) symbol of individual slots in time domain,
wherein a subcarrier spacing for the uplink transmission is 3.75 kHz and the single OFDM symbol is a fifth OFDM symbol of individual slots in time domain;
wherein the demodulation reference signal is determined based on a Hadamard sequence and a pseudo-random sequence.

13. An apparatus for wireless communication, comprising:
a receiver configured to receive a demodulation reference signal for a uplink transmission from a base station, and
a processor configured to process the demodulation reference signal,
wherein the demodulation reference signal is mapped to a set of time-frequency resources for the uplink transmission, the set of time-frequency resources comprising one or more subcarriers in frequency domain and a single Orthogonal Frequency Division Multiplexing (OFDM) symbol of individual slots in time domain, and
wherein a subcarrier spacing for the uplink transmission is 15 kHz and the single OFDM symbol is a fourth OFDM symbol of individual slots in time domain;
wherein the demodulation reference signal is determined based on a Hadamard sequence and a pseudo-random sequence.

14. An apparatus for wireless communication, comprising:
a receiver configured to receive a demodulation reference signal for a uplink transmission from a base station, and
a processor configured to process the demodulation reference signal,
wherein the demodulation reference signal is mapped to a set of time-frequency resources for the uplink transmission, the set of time-frequency resources comprising one or more subcarriers in frequency domain and three Orthogonal Frequency Division Multiplexing (OFDM) symbols of individual slots in time domain, and
wherein a subcarrier spacing for the uplink transmission is 3.75 kHz and the three OFDM symbols are first, second and third symbols of individual slots in time domain;
wherein the demodulation reference signal is determined based on a Hadamard sequence and a pseudo-random sequence.

* * * * *

UNITED STATES PATENT AND TRADEMARK OFFICE
CERTIFICATE OF CORRECTION

PATENT NO. : 10,644,850 B2
APPLICATION NO. : 15/987888
DATED : May 5, 2020
INVENTOR(S) : Weiwei Yang et al.

It is certified that error appears in the above-identified patent and that said Letters Patent is hereby corrected as shown below:

On the Title Page

In Item (30), under "Foreign Application Priority Data", in Column 1, Line 1, delete "Jan. 11, 2016 (CN) ...... 2016 1 1610019" and insert -- Jan. 11, 2016 (CN) ...... 2016 1 0019212 --, therefor.

In the Specification

In Column 4, Line 36, delete "(DCT)" and insert -- (DFT) --, therefor.

In Column 4, Line 39, delete "(CGS)" and insert -- (CSS) --, therefor.

In Column 7, Line 20, delete "(DCT)" and insert -- (DFT) --, therefor.

In Column 7, Line 23, delete "(CGS)" and insert -- (CSS) --, therefor.

In Column 14, Line 29, delete "(DCT)" and insert -- (DFT) --, therefor.

In Column 14, Line 50, delete "(DCT)" and insert -- (DFT) --, therefor.

In Column 14, Line 53, delete "(CGS)" and insert -- (CSS) --, therefor.

In Column 16, Line 65, delete "4~8" and insert -- 4-8 --, therefor.

In Column 16, Line 66, delete "4~8" and insert -- 4-8 --, therefor.

In Column 25, Line 19, delete "Cases 1~3" and insert -- Cases 1-3 --, therefor.

In Column 25, Line 50, delete "(DCT)" and insert -- (DFT) --, therefor.

In Column 25, Line 53, delete "(CGS)" and insert -- (CSS) --, therefor.

Signed and Sealed this
Eighth Day of September, 2020

Andrei Iancu
*Director of the United States Patent and Trademark Office*

CERTIFICATE OF CORRECTION (continued)
U.S. Pat. No. 10,644,850 B2

In the Claims

In Column 28, Line 32, in Claim 6, delete "a uplink" and insert -- an uplink --, therefor.

In Column 28, Line 48, in Claim 7, delete "a uplink" and insert -- an uplink --, therefor.

In Column 28, Line 64, in Claim 8, delete "a uplink" and insert -- an uplink --, therefor.

In Column 29, Line 26, in Claim 9, delete "315 kHz" and insert -- 3.75 kHz --, therefor.

In Column 29, Line 54, in Claim 11, delete "configured to;" and insert -- configured to: --, therefor.

In Column 30, Line 20, in Claim 12, delete "domain," and insert -- domain, and --, therefor.

In Column 30, Line 30, in Claim 13, delete "a uplink" and insert -- an uplink --, therefor.

In Column 30, Line 49, in Claim 14, delete "a uplink" and insert -- an uplink --, therefor.